US010793446B2

(12) United States Patent
Kim

(10) Patent No.: US 10,793,446 B2
(45) Date of Patent: Oct. 6, 2020

(54) WATER PURIFIER

(71) Applicant: LG ELECTRONICS INC., Seoul (KR)

(72) Inventor: Sungjoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 205 days.

(21) Appl. No.: 15/919,601

(22) Filed: Mar. 13, 2018

(65) Prior Publication Data

US 2018/0265376 A1 Sep. 20, 2018

(30) Foreign Application Priority Data

Mar. 17, 2017 (KR) .................. 10-2017-0034033

(51) Int. Cl.
*C02F 1/00* (2006.01)
*C02F 1/02* (2006.01)
(Continued)

(52) U.S. Cl.
CPC .............. *C02F 1/008* (2013.01); *C02F 1/003* (2013.01); *C02F 1/02* (2013.01); *F24H 1/101* (2013.01);
(Continued)

(58) Field of Classification Search
CPC .. C02F 1/008; C02F 1/003; C02F 1/02; C02F 2307/10; C02F 2209/02; C02F 2209/003; C02F 2209/44; H05B 6/108
(Continued)

(56) References Cited

U.S. PATENT DOCUMENTS

2015/0101670 A1* 4/2015 Bird ..................... F25D 23/12
137/1
2017/0003153 A1* 1/2017 Ward ................. F24D 19/1051
(Continued)

FOREIGN PATENT DOCUMENTS

JP          10-079294       3/1998
KR    10-2011-0080034       7/2011
(Continued)

OTHER PUBLICATIONS

Korean Office Action dated Jun. 20, 2018 issued in KR Application No. 10-2017-0034033.
(Continued)

*Primary Examiner* — Thien S Tran
(74) *Attorney, Agent, or Firm* — Ked & Associates, LLP

(57) ABSTRACT

A water purifier includes a water outlet discharging purified water therethrough, a first temperature sensor to sense temperature of the purified water, an induction heating module provided with a working coil forming magnetic field according to a current flow, and a hot water tank heated by the magnetic field and receiving the purified water to deliver to the water outlet, and a controller to control the current to flow on the working coil while the purified water is transferred to the water outlet through the hot water tank in response to a water discharge request, wherein the controller controls the current value flowing on the working coil, such that purified water lower than the target temperature is discharged until a predetermined time point from when the water discharge request is applied, and purified water higher than the target temperature is discharged after the predetermined time point.

20 Claims, 9 Drawing Sheets

(51) Int. Cl.
*F24H 1/10* (2006.01)
*H05B 6/10* (2006.01)

(52) U.S. Cl.
CPC ........ *H05B 6/108* (2013.01); *C02F 2209/003* (2013.01); *C02F 2209/02* (2013.01); *C02F 2209/40* (2013.01); *C02F 2209/44* (2013.01); *C02F 2307/10* (2013.01)

(58) Field of Classification Search
USPC .................. 99/282, 293, 323.1; 426/429
See application file for complete search history.

(56) References Cited

U.S. PATENT DOCUMENTS

2017/0153056 A1* 6/2017 Kim .................. B01D 35/1435
2018/0354776 A1* 12/2018 Lee ..................... B01D 35/005

FOREIGN PATENT DOCUMENTS

| | | | |
|---|---|---|---|
| KR | 10-2011-0096868 | 8/2011 | |
| WO | WO-2006101326 A1 * | 9/2006 | ......... G05D 23/1934 |
| WO | WO-2010143864 A2 * | 12/2010 | .............. F24H 1/00 |
| WO | WO 2016/186343 | 11/2016 | |

OTHER PUBLICATIONS

Indian Office Action dated Apr. 30, 2020 issued in IN Application No. 201834008282.

* cited by examiner

WATER PURIFIER

CROSS-REFERENCE TO RELATED APPLICATION

This application claims priority under 35 U.S.C. § 119 to Korean Application No. 10-2017-0034033, filed on Mar. 17, 2017, whose entire disclosure is hereby incorporated by reference.

BACKGROUND

1. Field

The present disclosure relates to a water purifier for generating hot water by an induction heating method.

2. Background

Induction heating refers to a heating method in which an object to be heated is heated using electromagnetic induction. When current is supplied to a coil, eddy current is generated in the object to be heated, and Joule heat caused due to resistance of a metal increases temperature of the object to be heated. Generally, an induction heating apparatus is provided with one or more electromagnets and coils.

In recent years, user's preference for direct type water supply devices (for example, water purifiers or refrigerators) is increasing more than for water tank type water supply devices. The water tank type water supply device refers to a water supply device that stores raw water in a water tank after filtration and then supplies purified water stored in the water tank when a user requests for water. On the other hand, the direct type water supply device refers to a water supply device that is not equipped with a water tank and supplies purified water to a user by filtering raw water immediately when the user requests for water. The direct type water supply device is recognized as being hygienic and saving water, compared to the water tank type water supply device.

In addition, there is an increasing demand for reducing a size of the water supply device to efficiently utilize a limited space. A water supply device that supplies hot water also adopts an induction heating method that can generate hot water quickly without taking up a lot of volume according to the tendency of the miniaturization and preference for the direct type. However, since the direct type water purifier is not equipped with a water tank for storing hot water, it has difficulty in supplying hot water of a user-desired temperature within a short time after receiving the user's request.

BRIEF DESCRIPTION OF THE DRAWINGS

The embodiments will be described in detail with reference to the following drawings in which like reference numerals refer to like elements, and wherein.

DETAILED DESCRIPTION

Figure 1:
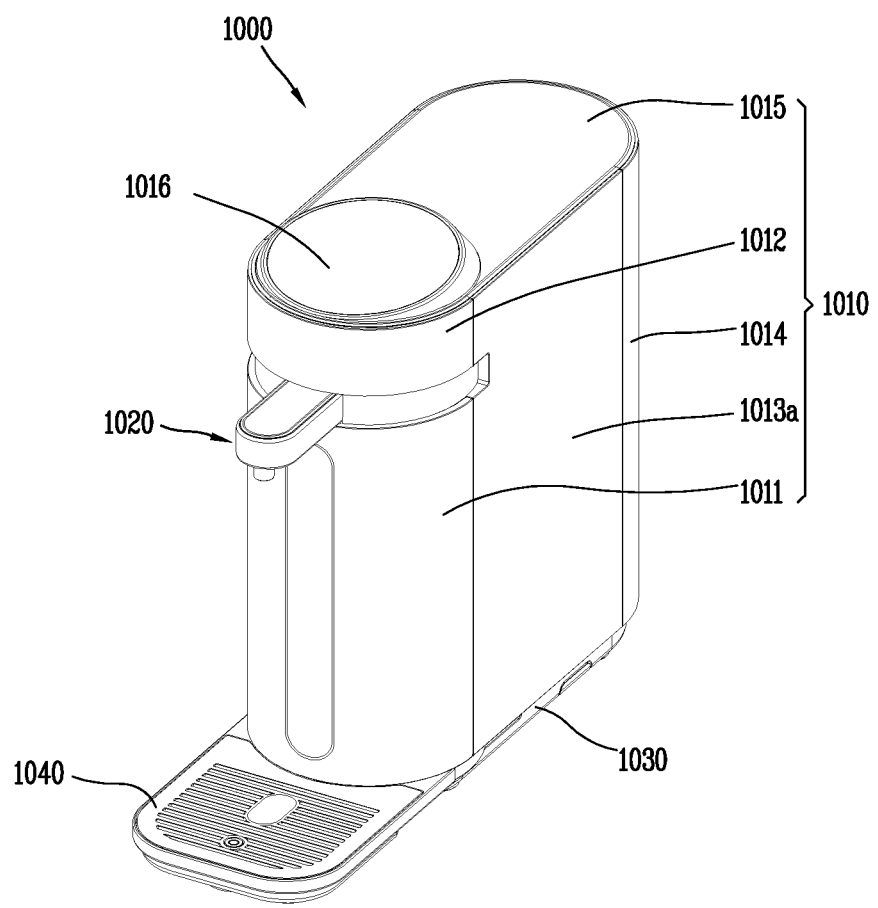
FIG. 1 is a perspective view illustrating a water purifier according to one embodiment of the present disclosure.

FIG. 1 is a perspective view illustrating a water purifier according to one embodiment of the present disclosure. The water purifier 1000 includes a cover 1010, a water outlet (or dispenser) 1020, a base 1030, and a tray 1040.

The cover 1010 defines an appearance of the water purifier 1000. The appearance of the water purifier 1000 defined by the cover 1010 may be referred to as a main body of the water purifier 1000. Components for filtering raw water are installed inside the main body of the water purifier 1000. The cover 1010 surrounds the components to protect the components. The name of the cover 1010 may be changed to a case, a housing or the like. Any name is equivalent to the cover 1010 described in the present disclosure if it defines the appearance of the water purifier 1000 and encloses the components for filtering raw water.

The cover 1010 may be formed as a single component, but may be formed by a combination of several components. For example, as illustrated in FIG. 1, the cover 1010 may include a front cover 1011, a rear cover 1014, side panels 1013*a*, an upper cover 1012, and a top cover 1015.

The front cover 1011 is provided at the front of the water purifier 1000. The rear cover 1014 is provided at the rear of the water purifier 1000. Here, the front and rear sides of the water purifier 1000 are set based on a direction in which a user gazes the water outlet 1020 in front of the water outlet 1020. However, since the concept of the front and rear sides of the water purifier 1000 is not necessarily limited to this, it may vary depending on a manner of describing the water purifier 1000.

The side panels 1013*a* are provided at right and left sides of the water purifier 1000, respectively. The side panels 1013*a* are provided between the front cover 1011 and the rear cover 1014. The side panels 1013*a* may be coupled to the front cover 1011 and the rear cover 1014, respectively. The side panels 1013a substantially form side surfaces of the water purifier 1000.

The upper cover 1012 is provided at the front of the water purifier 1000. The upper cover 1012 is installed at a position higher than the front cover 1011. The water outlet 1020 is exposed to a space between the upper cover 1012 and the front cover 1011. The upper cover 1012 forms appearance of the front surface of the water purifier together with the front cover 1011.

The top cover 1015 forms a top surface of the water purifier 1000. An input/output unit (or user interface) 1016 may be provided on a front portion of the top cover 1015. The input/output unit 1016 is a concept including an input unit and an output unit. The input unit is configured to receive a user's control command. A manner in which the input unit receives the user's control command may include or selectively include a touch input manner, a physically-pressing manner, and the like. The output unit is provided to visually and audibly provide status information regarding the water purifier 1000 to the user.

The water outlet (an extracting unit or a faucet assembly) 1020 functions to supply purified water to the user therethrough according to the user's control command. At least portion of the water outlet 1020 is exposed to outside of the main body of the water purifier 1000 in order to supply water therethrough. Particularly, in the water purifier 1000 which is configured to supply purified water of room temperature, cold water cooler than the room temperature and hot water hotter than the room temperature, at least one of the purified water of the room temperature, the cold water and the hot water may be discharged through the water outlet 1020 according to a control command applied by the user.

The water outlet 1020 may be configured to be rotatable according to the user's operation. The front cover 1011 and the upper cover 1012 may form a rotation area of the water outlet 1020 therebetween, and the water outlet 1020 may rotate to the right and left within the rotation area. The rotation of the water outlet 1020 may be performed by force physically applied to the water outlet 1020 by the user. The rotation of the water outlet 1020 may be performed based on a control command that the user applies to the input/output unit 1016. The structure for implementing the rotation of the water outlet 1020 may be installed inside the water purifier 1000, specifically, in an area obscured by the upper cover 1012. The input/output unit 1016 may also be configured to rotate together with the water outlet 1020 during the rotation of the water outlet 1020.

The base 1030 forms a bottom of the water purifier 1000. The internal components of the water purifier 1000 are supported by the base 1030. When the water purifier 1000 is placed on a floor or a shelf, the base 1030 faces the floor or the shelf. Therefore, when the water purifier 1000 is placed on the floor or the shelf, the structure of the base 1030 is not exposed to the outside.

A tray 1040 is provided to face the water outlet 1020. The tray 1040 faces the water outlet 1020 in up and down directions, on the basis of a case where the water purifier 1000 is installed as illustrated in FIG. 1. The tray 1040 is formed to support a container or the like for storing purified water or the like discharged through the water outlet 1020. Further, the tray 1040 is formed to receive residual water falling from the water outlet 1020. When the tray 1040 receives and accommodates the residual water falling from the water outlet 1020, contamination which is caused due to the residual water around the water purifier 1000 can be prevented.

Since the tray 1040 receives the residual water falling from the water outlet 1020, the tray 1040 may also be configured to rotate together with the water outlet 1020. The input/output unit 1016 and the tray 1040 are preferably configured to rotate in the same direction as the water outlet 1020.

Figure 2:
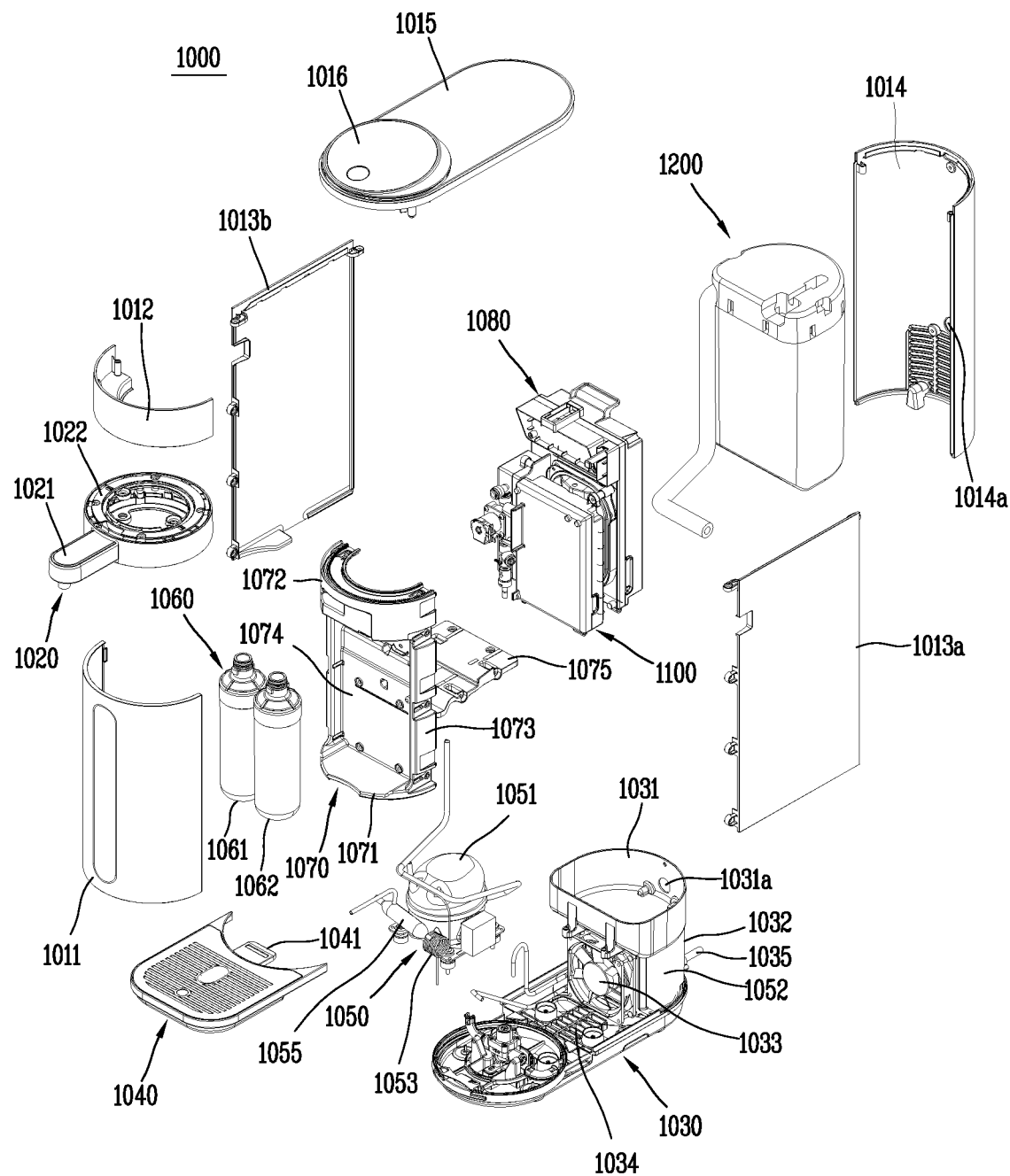
FIG. 2 is an exploded perspective view illustrating an internal structure of the water purifier illustrated in FIG. 1.

FIG. 2 is an exploded perspective view illustrating an internal structure of the water purifier 1000 illustrated in FIG. 1. A filter unit (or filter) 1060 is provided inside the front cover 1011. The filter unit 1060 is configured to filter raw water supplied from a raw water supply unit to generate purified water. The filter unit 1060 may include a plurality of unit filters 1061 and 1062 since only one filter may be difficult to generate purified water which is appropriate for the user to drink. The unit filters 1061 and 1062, for example, may include a prefilter such as a carbon block or an adsorption filter, a high-performance filter such as a High Efficiency Particulate Air (HEPA) filter, an Ultra Filteration or Ultra Filteration filter (UF) filter, and the like. Although two unit filters 1061 and 1062 are provided in FIG. 2, the number of unit filters 1061 and 1062 may increase or decrease, as desired.

The plurality of unit filters 1061 and 1062 are connected in a preset order. The preset order refers to a proper order for the filter unit 1060 to filter water. Raw water may contain various foreign substances. The high-performance filters such as the HEPA filters or the UF filters must be protected from large particles such as hair and dust since the large particles cause deterioration of a filtering performance of the high performance filters. Therefore, in order to protect the high-performance filters, the prefilter must be installed at an upstream side of the high-performance filters.

The prefilter is configured to remove large particles from water. When the prefilter is provided at the upstream side of the high-performance filters to first filter large particles contained in raw water, the raw water without containing the large particles is supplied to the high-performance filters, which may result in protecting the high-performance filters. The raw water that has passed through the prefilter is then filtered by the HEPA filter, the UF filter or the like.

The purified water generated by the filter unit 1060 may be supplied to the user directly through the water outlet 1020. In this case, a temperature of the purified water supplied to the user corresponds to room temperature. On the other hand, the purified water generated by the filter unit 1060 may be heated by an induction heating module (or induction heater) 1100 or cooled by a cold water tank assembly (or chiller) 1200.

The filter bracket assembly 1070 is a structure that fixes the unit filters 1061 and 1062 of the filter unit 1060 and fixes components such as an outlet flow path of purified water, cold water and the like, a valve, a sensor and the like. A lower portion 1071 of the filter bracket assembly 1070 is coupled to the tray 1040. The lower portion 1071 of the filter bracket assembly 1070 accommodates a protruded coupling portion 1041 of the tray 1040. The protruded coupling portion 1041 of the tray 1040 is inserted into the lower portion 1071 of the filter bracket assembly 1070, such that the tray 1040 can be coupled to the filter bracket assembly 1070.

The lower portion 1071 of the filter bracket assembly 1070 and the tray 1040 have curved surfaces corresponding to each other. The lower portion 1071 of the filter bracket assembly 1070 may be independently rotated relative to the other portion of the filter bracket assembly 1070.

An upper portion 1072 of the filter bracket assembly 1070 is configured to support the water outlet 1020. The upper portion 1072 of the filter bracket assembly 1070 forms a rotation path of the water outlet 1020. The water outlet 1020 may be divided into a discharge faucet portion 1021 protruding to outside of the water purifier 1000, and a rotating portion 1022 provided inside the water purifier 1000. The rotating portion 1022, as illustrated in FIG. 2, may be formed in a circular shape for rotation. The rotating portion 1022 is mounted on the upper portion 1072 of the filter bracket assembly 1070. The water outlet 1020 mounted on the upper portion 1072 of the filter bracket assembly 1070 is configured to be rotated relative to the filter bracket assembly 1070.

The lower portion 1071 and the upper portion 1072 of the filter bracket assembly 1070 may be connected to each other by an up/down connecting portion 1073. The lower portion 1071 and the upper portion 1072 of the filter bracket assembly 1070 connected to each other by the up/down connecting portion 1073 may be rotated in the same direction. When the user rotates the water outlet 1020, the upper portion 1072 of the filter bracket assembly 1070 connected to the water outlet 1020, the up/down connecting portion 1073 and the lower portion 1071 of the filter bracket assembly 1070, and the tray 1040 may be rotated together with the water outlet 1020.

A filter installation area 1074 is formed between the lower portion 1071 and the upper portion 1072 of the filter bracket assembly 1070 to accommodate the unit filters 1061 and 1062 of the filter unit 1060. The filter installation area 1074 provides an installation space for the unit filters 1061 and 1062.

A support (or support surface) 1075 protruding toward the rear of the water purifier 1000 is formed on an opposite side of the filter installation area 1074. The support 1075 is configured to support a controller 1080 and an induction heating module 1100. The controller 1080 and the induction heating module 1100 are placed on the support 1075. The support 1075 is provided between the induction heating module 1100 and a compressor 1051 to block heat generated in the induction heating module 1100 from being transferred to the compressor 1051 or the like.

The controller 1080 is configured to perform an overall control of the water purifier 1000. The controller 1080 may be provided therein with a variety of printed circuit boards for controlling the operation of the water purifier 1000.

The induction heating module (or induction heater) 1100 heats purified water generated in the filter unit 1060 to generate hot water. The induction heating module 1100 is provided with components which are configured to heat the purified water in an induction heating manner. The induction heating module 1100 receives the purified water supplied from the filter unit 1060, and the hot water generated by the induction heating module 1100 is discharged through the water outlet 1020.

The induction heating module 1100 may include a printed circuit board for controlling a hot water generation. A protection cover (not illustrated) may be coupled to one side of the induction heating module to prevent water from permeating into the printed circuit board and to protect the printed circuit board when a fire occurs.

A refrigeration cycle apparatus 1050 is configured to generate cold water. The refrigeration cycle apparatus 1050 refers to a set or assembly of devices in which a process of compression-condensation-expansion-evaporation R of refrigerant takes place continuously. In order to generate cold water in the cold water tank assembly 1200, firstly, the refrigeration cycle apparatus 1050 should operate to cool cooling water, which is filled in the cold water tank assembly 1200, down to a low temperature.

The refrigeration cycle apparatus 1050 includes a compressor 1051, a condenser 1052, a capillary tube 1053, an evaporator (not illustrated, provided inside the cold water tank assembly), a dryer 1055, and a refrigerant flow path for connecting those components. The refrigerant flow path may be formed by a pipe or the like. The refrigerant flow path connects the compressor 1051, the condenser 1052, the capillary tube expansion device 1053, and the evaporator to form a circulation passage of a refrigerant.

The compressor 1051 is configured to compress the refrigerant. The compressor 1051 is connected to the condenser 1052 through the refrigerant flow path, and the refrigerant compressed in the compressor 1051 flows into the condenser 1052 through the refrigerant flow path. The compressor 1051 may be provided below the support 1075 and is installed to be supported by the base 1030.

The condenser 1052 is configured to condense the refrigerant. The refrigerant compressed in the compressor 1051 flows into the condenser 1052 through the refrigerant flow path, and then is condensed by the condenser 1052. The refrigerant condensed in the condenser 1052 flows into the dryer 1055 through the refrigerant flow path.

The dryer 1055 is configured to remove moisture from the refrigerant. In order to improve efficiency of the refrigeration cycle apparatus 1050, moisture must be removed in advance from the refrigerant to be introduced into the capillary tube 1053 and the evaporator. The dryer 1055 is installed between the condenser 1052 and the capillary tube 1053 to remove moisture from the refrigerant, thereby improving the efficiency of the refrigeration cycle apparatus 1050.

The expansion of the refrigerant is realized by the capillary tube 1053. The capillary tube 1053 is configured to expand the refrigerant, and a throttling valve or the like may alternatively configure the expansion device instead of the capillary tube 1053 according to design. The capillary tube 1053 may be rolled in a shape of coil to ensure a sufficient length within a narrow space.

The evaporator is configured to evaporate the refrigerant and is installed inside the cold water tank assembly 1200. Cooling water filled in the cold water tank assembly 1200 and the refrigerant in the refrigeration cycle apparatus 1050 may exchange heat with each other in the evaporator, and the cooling water may be maintained at a low temperature by the heat exchange. And purified water can be cooled by the cooling water kept at the low temperature. The refrigerant heated by the heat exchange with the cooling water in the evaporator flows back into the compressor 1051 along the refrigerant flow path, and continuously circulates in the refrigeration cycle apparatus 1050.

The base 1030 supports the compressor 1051, the front cover 1011, the rear cover 1014, the side panels 1013*a* and 1013*b*, the filter bracket assembly 1070, the condenser 1052, a fan 1033, and the like. To support these components, the base 1030 preferably has high rigidity.

The condenser 1052 and the fan 1033 may be installed on the rear side of the water purifier 1000. Continuous air circulation is used in order to radiate heat from the condenser 1052. An intake port 1034 may be formed through the bottom of the base 1030 for air circulation. Air sucked through the intake port 1034 flows by the fan 1033. The air flows toward the condenser 1052 to achieve air-cooled cooling. A duct structure 1032 surrounding the fan 1033 and the condenser 1052 may be fixed to the base 1030 to increase heat radiation efficiency of the condenser 1052.

A drain 1035 is provided at the rear of the duct structure 1032. The drain 1035 is exposed to the outside of the water purifier 1000 to form a drainage flow path. Since the internal flow paths of the water purifier 1000 communicate all together, even if the drain 1035 is connected to only one internal flow path, a fluid existing in the internal flow path can fully be discharged through the drain 1035.

A holder 1031 may be provided on a top of the condenser 1052 to support the cold water tank assembly 1200. The holder 1031 is provided with a first hole 1031a on the rear thereof and the rear cover 1014 is provided with a second hole 1014a. The first hole 1031a and the second hole 1014a are formed at positions corresponding to each other. The first hole 1031a and the second hole 1014a are formed to dispose a drain valve 1280 (see FIG. 3) for draining cooling water filled in the cold water tank assembly 1200.

The cold water tank assembly 1200 is formed to store the cooling water therein. The cold water tank assembly 1200 receives purified water generated in the filter unit 1060. In particular, for the direct type water purifier 1000 having no separate water tank, the cold water tank assembly 1200 may receive the purified water directly from the filter unit 1060.

A temperature of the cooling water filled in the cold water tank assembly 1200 is lowered by the operation of the refrigeration cycle apparatus 1050. The cold water tank assembly 1200 is configured to cool the purified water using the cooling water to generate cold water.

Since the cooling water is stored in the cold water tank assembly 1200 without circulation, a pollution level of the cooling water increases after a long period of time. For hygiene, the cooling water stored in the cold water tank assembly should be periodically discharged to the outside, and new cooling water should be filled in the cold water tank assembly 1200.

Figure 3:
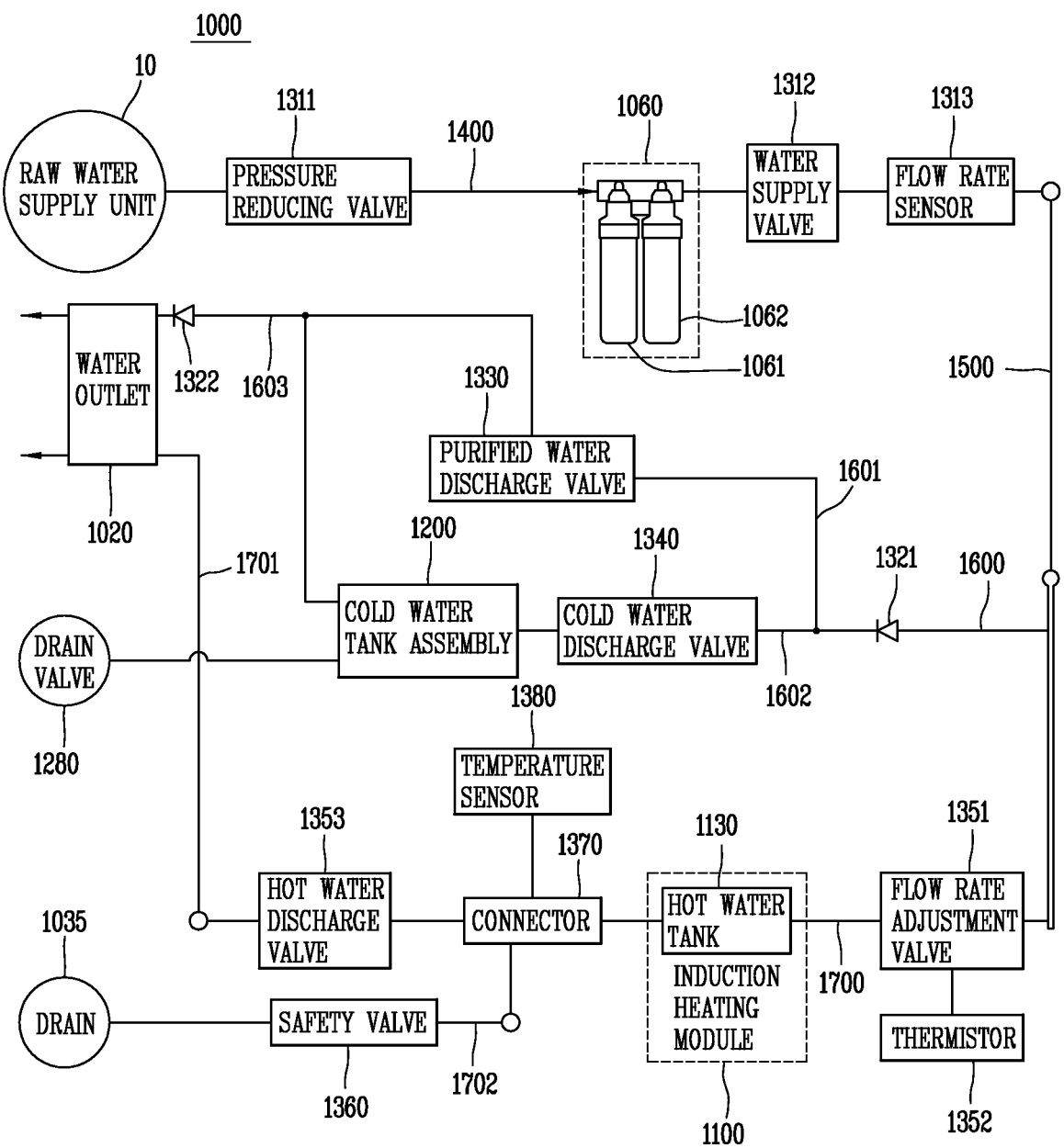
FIG. 3 is a conceptual view illustrating a flow path configuration of the water purifier according to the present disclosure.

FIG. 3 is a conceptual view illustrating a flow path configuration of the water purifier 1000 according to the present disclosure. A solid line in FIG. 3 represents a flow path of water. The flow path of the water may be divided into a raw water line 1400 which is an upstream side of the filter unit 1060 and a purified water line 1500 which is a downstream side of the filter unit 1060, on the basis of the filter unit 1060. Here, the upstream side or the downstream side is divided based on a flow of water.

A water supply valve 1312 is opened and closed based on a control command input through the input unit 1016 (see FIG. 1). When a control command for discharging (supplying) purified water, hot water or cold water is input through the input unit 1016, the water supply valve 1312 is opened such that raw water can be supplied from the raw water supply unit 10 to the filter unit 1060.

The raw water passes through a pressure reducing valve 1311 during a process of being supplied to the filter unit 1060. The pressure reducing valve 1311 is provided between the raw water supply unit 10 and the filter unit 1060. The pressure reducing valve 1311 is configured to reduce pressure of the raw water supplied from the raw water supply unit 10.

Since the direct type water purifier 1000 is not provided a water tank, pressure of purified water discharged through the water outlet 1020 is decided by the pressure of the raw water supplied from the raw water supply unit 10. Generally, since the pressure of the raw water supplied from the raw water supply unit 10 is high, if the pressure reducing valve 1311 is not provided, the water may be discharged through the water outlet 1020 at excessively high pressure. Also, the unit filters 1061 and 1062 of the filter unit 1060 are likely to be physically damaged by the pressure of the raw water. Therefore, decompression of the raw water is used.

The pressure reducing valve 1311 reduces the pressure of the raw water supplied from the raw water supply unit 10 to the filter unit 1060. Accordingly, the filter unit 1060 can be protected, and water can be discharged from the water outlet 1020 at appropriate pressure.

The raw water is filtered while sequentially passing through the unit filters 1061 and 1062 of the filter unit 1060. On the basis of the filter unit 1060, water at the upstream side of the filter unit 1060 may be referred to as raw water and water at the downstream side may be referred to as purified water.

The purified water generated in the filter unit 1060 sequentially passes through the water supply valve 1312 and a flow rate sensor 1313. The flow rate sensor 1313 is configured to measure a flow rate supplied from the filter unit 1060. The flow rate measured by the flow rate sensor 1313 is used for controlling the water purifier.

For example, when a control command for discharging (dispensing, dropping) a predetermined quantity of purified water is input through the input unit 1060 of the water purifier 1000, a pulse value corresponding to the predetermined quantity is input into the flow rate sensor 1313 by the controller 1080, and the water supply valve 1312 is opened by the control of the controller 1080. When purified water of a flow rate corresponding to the pulse value passes through the flow rate sensor 1313, the controller 1080 receives a feedback from the flow rate sensor 1313 to control the water supply valve 1312, and the water supply valve 1312 is closed by the control of the controller 1080. The flow rate measured by the flow rate sensor 1313 through such a process may be used for controlling the water purifier 1000.

The purified water line 1500 connected to the flow rate sensor 1313 is divided into two branches 1600 and 1700, one of which is sequentially connected to a flow rate adjustment valve 1351 and the induction heating module 1100. This branch, which is sequentially connected to the flow rate adjustment valve 1351 and the induction heating module 1100, may be referred to as a hot water line 1700. The other branch 1600 is provided with a check valve 1321. The other branch 1600 is then branched into a purified water line 1601 and a cold water line 1602 at a downstream side of the check valve 1321. The purified water line 1601 is provided with a purified water discharge valve 1330 and the cold water line 1602 is provided with a cold water discharge valve 1340. The purified water line 1601 and the cold water line 1602 are joined into a flow path 1603 to be connected to the water outlet 1020 and the check valve 1322 is installed at the joined flow path 1603.

The two check valves 1321 and 1322 which are installed at the upstream side and the downstream side of the purified water discharge valve 1330 and the cold water discharge valve 1340 may be distinguishably referred to as a first check valve 1321 and a second check valve 1322. The first check valve 1321 and the second check valve 1322 are to prevent generation of residual water.

When a control command for supplying hot water is input to the water purifier, the water supply valve 1312, the flow rate adjustment valve 1351 and a hot water discharge valve 1353 are opened, so that hot water can be discharged through the hot water line 1700. In this process, since internal pressure of the purified water line 1601 and the cold water line 1602 is lowered, the purified water discharge valve 1330 or the cold water discharge valve 1340 may be instantaneously opened and then closed. There is no problem of residual water in a structure in which the water outlet 1020 is provided with only one discharging faucet and both cold water and hot water are discharged through the one discharging faucet. On the other hand, in a structure in which cold water and hot water are both discharged through two different discharging faucets, while hot water is discharged through one of the two discharging faucets, a small quantity of residual water may be discharged from the other discharging faucet.

However, if the first check valve 1321 is installed at an upstream side of a branched point between the purified water line 1500 and the cold water line 1602, it may prevent a pressure change, which is occurred during the discharge of the hot water through the hot water line 1700, from being transferred to the purified water line 1601 and the cold water line 1602, respectively. This may result in preventing the purified water discharge valve 1330 or the cold water discharge valve 1340 from being instantaneously opened and then closed.

When the configuration in which the cold water discharge valve 1340 is provided at the upstream side of the cold water tank assembly 1200 is compared with the configuration in which the cold water discharge valve 1340 is provided at the downstream side of the cold water tank assembly 1200, cold water may be obtained more in the former than in the latter. This is because a quantity of cold water corresponding to a length of a flow path between the cold water tank assembly 1200 and the cold water discharge valve 1340 may be further supplied. Therefore, the cold water discharge valve 1340 is preferably installed at the upstream side of the cold water tank assembly 1200 as illustrated. However, in the structure in which the cold water discharge valve 1340 is installed at the upstream side of the cold water tank assembly 1200, residual water may be generated in the cold water line 1602 due to a change in internal pressure of the cold water line 1602 and a small quantity of residual water may be discharged through the water outlet 1020 even though the water discharge has been stopped.

However, when the second check valve 1322 is installed at the joined flow path 1603 of the purified water line 1602 and the cold water line 1602, this structure can prevent the pressure change in the cold water line 1602 from being transferred to the water outlet 1020. This may result in preventing an occurrence of a phenomenon that a small quantity of residual water is discharged through the water outlet 1020 when the water discharge has been stopped.

The purified water passing through the flow rate sensor 1313 may be supplied in a state of room temperature to the user immediately or after changing to hot water or cold water.

The purified water discharge valve 1330 and the cold water discharge valve 1340 are opened and closed, respectively, based on a control command input through the input unit 1016. The water supply valve 1312 and the purified water discharge valve 1330 are opened when a control command for discharging (dropping, pouring) the purified water is input through the input unit 1016. The purified water generated in the filter unit 1060 is discharged through the water outlet 1020 along the purified water line 1601. Similarly, when a control command for discharging (dropping) cold water is input through the input unit 1016, the water supply valve 1312 and the cold water discharge valve 1340 are opened. The purified water generated in the filter unit 1060 flows into the cold water tank assembly 1200 along the cold water line 1602 and is cooled while passing through the cold water tank assembly 1200. Cold water generated in the cold water tank assembly 1200 is discharged through the water outlet 1020.

The cold water tank assembly 1200 is provided with a drain valve 1280. Cooling water filled in the cold water tank assembly 1200 may be discharged to the outside through the drain valve 1280.

The hot water line 1700 is provided with a flow rate adjustment valve 1351. If an appropriate flow rate or more is introduced into the hot water tank 1130 (see FIG. 4), sufficient heating may not be performed, and thus the flow rate should always be adjusted so that only a proper quantity of water is introduced. The flow rate adjustment valve 1351 is provided at the upstream side of the induction heating module 1100 to adjust the flow rate of the purified water flowing into the hot water tank 1130.

The flow rate adjustment valve 1351 may be provided together with a thermistor 1352. A temperature of purified water measured by the thermistor 1352 is used for controlling the induction heating module 1100. For example, when the temperature of the purified water measured by the thermistor 1352 is relatively low, the induction heating module 1100 may be operated with high power. Conversely, when the temperature of the purified water measured by the thermistor 1352 is relatively high, the induction heating module 1100 may be operated with low power.

The hot water lines 1700 and 1701 may be divided into an upstream side and a downstream side based on the induction heating module 1100. The upstream side hot water line 1700 is branched out from the purified water line 1500 and is connected to the hot water tank 1130 of the induction heating module 1100. The downstream side hot water line 1701 is connected to the water outlet 1020 so as to form a discharge flow path of hot water generated in the hot water tank 1130 of the induction heating module 1100.

A hot water discharge valve 1353 is provided at the downstream side hot water line 1701 to open and close the hot water lines 1700 and 1701. The hot water discharge valve 1353 is operated by a control command input to the water purifier 1000. When a control command for discharging hot water, the water supply valve 1312 and the hot water discharge valve 1353 are opened and the hot water comes out along the upstream side hot water line 1700 and the downstream side hot water line 1701.

Figure 4:
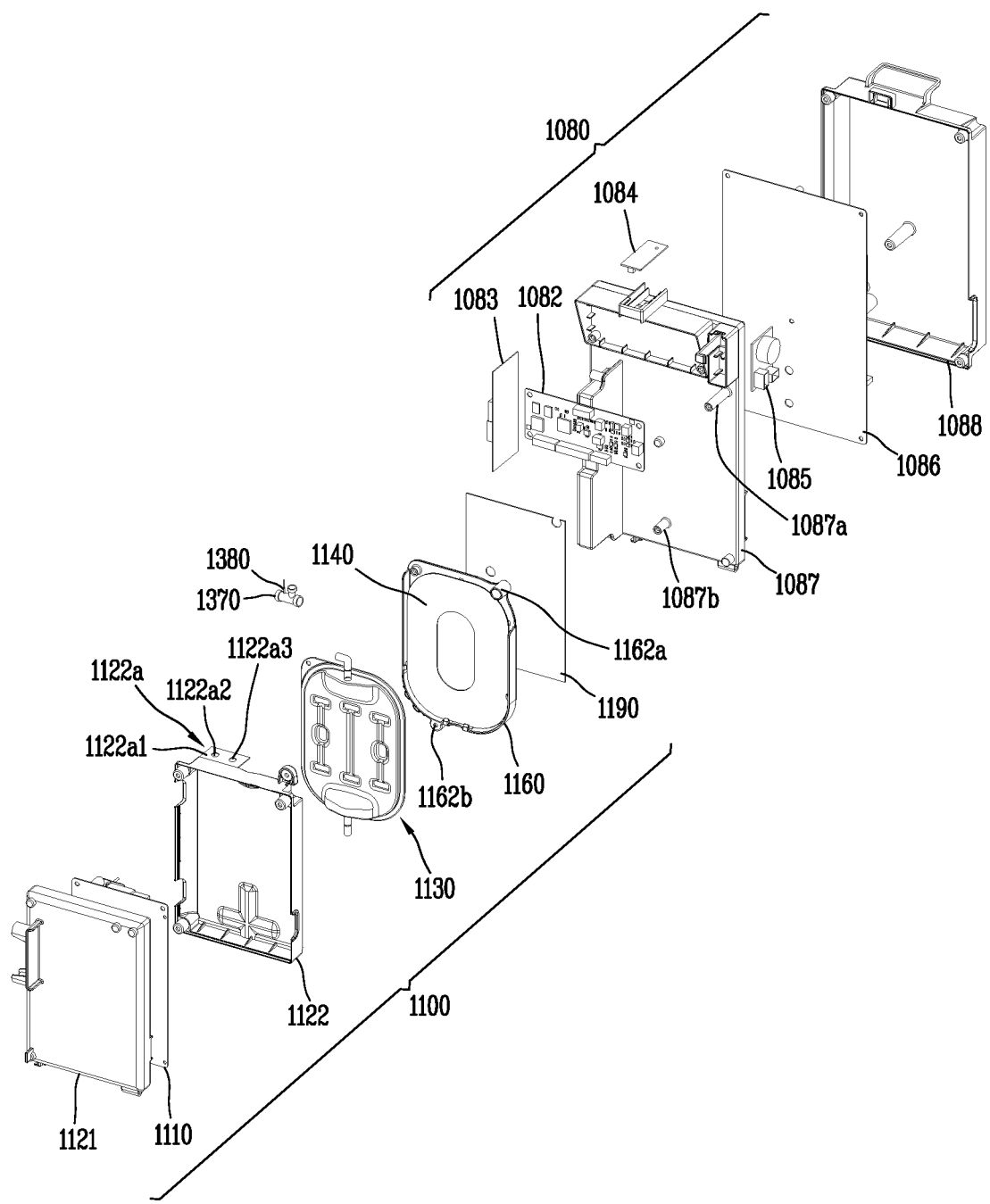
FIG. 4 is an exploded perspective view of an induction heating module and a controller according to the present disclosure.

FIG. 4 is an exploded perspective view of an induction heating module 1100 and a controller 1080 according to the present disclosure. The induction heating module 1100 refers to a set or assembly of components that generate hot water by receiving purified water generated in the filter unit 1060 (see FIG. 2). In particular, in case of the direct type water purifier 1000 (see FIGS. 1 to 3) which is not provided with a separate water tank, the purified water is supplied from the filter unit 1060 (see FIG. 2) directly to the induction heating module 1100 without passing through the water tank. The induction heating module 1100 includes an induction heating printed circuit board (PCB) 1110, induction heating printed circuit board covers 1121 and 1122, a hot water tank 1130, a working coil 1140, a bracket 1060 and a shield plate 1190.

The induction heating printed circuit board 1110 controls an induction heating operation of the working coil 1140. Both ends of the working coil 1140 are connected to the induction heating printed circuit board 1110 and controlled by the induction heating printed circuit board 1110. For example, when the user inputs a control command through the input unit 1016 of the water purifier 1000 (see FIGS. 1 and 2) to extract (take out) hot water, the purified water generated in the filter unit 1060 (see FIG. 2) is supplied to the hot water tank 1130. The induction heating printed circuit board 1110 controls a current to flow along the working coil 1140. The hot water tank 1130 is inductively heated by the current supplied to the working coil 1140. The purified water is instantaneously heated into hot water while passing through the hot water tank 1130.

The induction heating printed circuit board covers 1121 and 1122 are provided to enclose the induction heating printed circuit board 1110. The induction heating printed circuit board covers 1121 and 1122 include a first induction heating cover 1121 and a second induction heating cover 1122.

The induction heating printed circuit board 1110 is installed in an inner space formed by the first induction heating cover 1121 and the second induction heating cover 1122. The first induction heating cover 1121 and the second induction heating cover 1122 are coupled to each other at their edges to prevent water permeation. In addition, a sealing member (not illustrated) for preventing the water permeation may be coupled to the edges of the first induction heating cover 1121 and the second induction heating cover 1122. The first induction heating cover 1121 and the second induction heating cover 1122 are preferably made of a flame retardant material to prevent the induction heating printed circuit board 1110 from being damaged due to fire.

The hot water tank 1130 heats the purified water to generate hot water. The hot water tank 1130 has an inner space for heating liquid. The hot water tank 1130 is subjected to induction heating under an influence of a magnetic force line formed by the working coil 1140. The liquid is heated into hot water while passing through the inner space of the hot water tank 1130. The hot water tank 1130 is configured to maintain airtightness.

In order to miniaturize a water purifier such as the water purifier 1000 (see FIG. 1) or a refrigerator, the hot water tank 1130 is miniaturized. The miniaturization of the water purifier may be realized only when a thickness of the hot water tank 1130 as well as a length and a width thereof is reduced more than those of the related art. Therefore, the hot water tank 1130 is preferably formed flat to facilitate realization of the miniaturized water purifier.

The working coil 1140 forms a magnetic force line for induction heating of the hot water tank 1130. The working coil 1140 is provided at one side of the hot water tank 1130 to face the hot water tank 1130. When a current is supplied to the working coil 1140, the magnetic force line is formed on the working coil 1140. This magnetic force line affects the hot water tank 1130, and the hot water tank 1130 is subjected to the induction heating by the affection of the magnetic force line.

The shield plate 1190 is provided at one side of the working coil 1140. The shield plate 1190 is provided at an opposite side of the hot water tank 1130 with respect to the working coil 1140. The shield plate 1190 is provided to prevent the magnetic force line generated on the working coil 1140 from being radiated to other areas except for the hot water tank 1130. The shield plate 1190 may be made of aluminum or other materials that change the flow of the magnetic force line.

A connector 1370 is connected to the hot water tank 1130. The connector 1370 may be directly connected to the hot water tank 1130, but may alternatively be connected to the hot water tank 1130 by a separate flow path. Even when the connector 1370 is connected to the hot water tank 1130 by a separate flow path, the separate flow path preferably has a short length if possible.

A first temperature sensor 1380 is coupled to the connector 1370. The first temperature sensor 1380 is configured to measure a temperature of hot water passing through the connector 1370. As the connector 1370 is provided closer to the hot water tank 110, accuracy of a temperature value measured by the first temperature sensor 1380 increases more.

A connecting portion (or connection surface) R1122a for fixing the connector 1370 to the inside of the water purifier 1000 may be formed on the induction heating printed circuit board cover 1122. The connecting portion 1122a includes a base 1122a1, and a first hole 1122a2 and a second hole 1122a3 formed through the base 1122a1. The connecting portion 1122a is not necessarily formed on the induction heating printed circuit board cover 1122 and may alternatively be located at any position in design if it can fix the connector 1370. The connection structure of the connecting portion 1122a and the connector 1370 will be described later.

The controller 1080 includes a control printed circuit board (or control PCB) 1082, a noise printed circuit board (or noise PCB) 1083, a near field communication (NFC) printed circuit board (or NFC PCB) 1084, a buzzer 1085, a main printed circuit board (or main PCB) 1086, and main printed circuit board covers 1087 and 1088.

The control printed circuit board 1082 is a sub-configuration of a display printed circuit board (not illustrated). The control printed circuit board 1082 is not an essential component for driving a water purifier, such as the water purifier 1000 (see FIG. 1), but assists a display printed circuit board (not illustrated).

The noise printed circuit board 1083 is provided to supply power to the induction heating printed circuit board 1110. Since an output voltage for induction heating is very high, sufficient power should be supplied. The noise printed circuit board 1083 is not an essential component for driving a water purifier such as the water purifier 1000 (see FIG. 1). However, a water purifier such as the water purifier 1000 (see FIG. 1) may have the noise printed circuit board 1083 in preparation of a case where power for induction heating is not sufficiently supplied. The noise printed circuit board 1083 may supply additional power to the induction heating printed circuit board 1110 to satisfy the output voltage for the induction heating. The noise printed circuit board 1083 may serve to supply auxiliary power even to other components as well as the induction heating printed circuit board 1110.

The buzzer 1085 outputs sound to provide a user with accurate failure information when the failure occurs in a water purifier such as the water purifier 1000 (see FIG. 1). The buzzer 1085 may output a specific sound of a pre-input code according to failure.

The NFC printed circuit board 1084 is provided to perform data exchange with a communication device. Personal communication devices such as smart phones are currently popularized. Accordingly, if a consumer can check a status of the water purifier or input a control command by using his or her personal communication device, the customer's convenience can be improved. The NFC printed circuit board 1084 may provide status information regarding the water purifier to a paired personal communication device, and receives a user's control command from the personal communication device.

The main printed circuit board 1086 controls the overall operation of a water purifier, such as the water purifier 1000 (see FIG. 1). The operation of the input/output unit 1016 (see FIG. 1) illustrated in FIG. 1 or the compressor 1051 (see FIG. 2) illustrated in FIG. 2 may be controlled by the main printed circuit board 1086. When power is insufficient, the main printed circuit board 1086 may receive additional power from the noise printed circuit board 1083.

The main printed circuit board covers 1087 and 1088 are configured to enclose the main printed circuit board 1086. The main printed circuit board covers 1087 and 1088 include the first main cover 1087 and the second main cover 1088. The main printed circuit board 1086 is installed in an inner space formed by the first main cover 1087 and the second main cover 1088.

The first main cover 1087 and the second main cover 1088 are coupled to each other at their edges to prevent water permeation. A sealing member (not illustrated) may be installed between the first main cover 1087 and the second main cover 1088 to prevent the water permeation. The first main cover 1087 and the second main cover 1088 are preferably made of a flame retardant material to prevent the main printed circuit board 1086 from being damaged due to fire.

Figure 5:
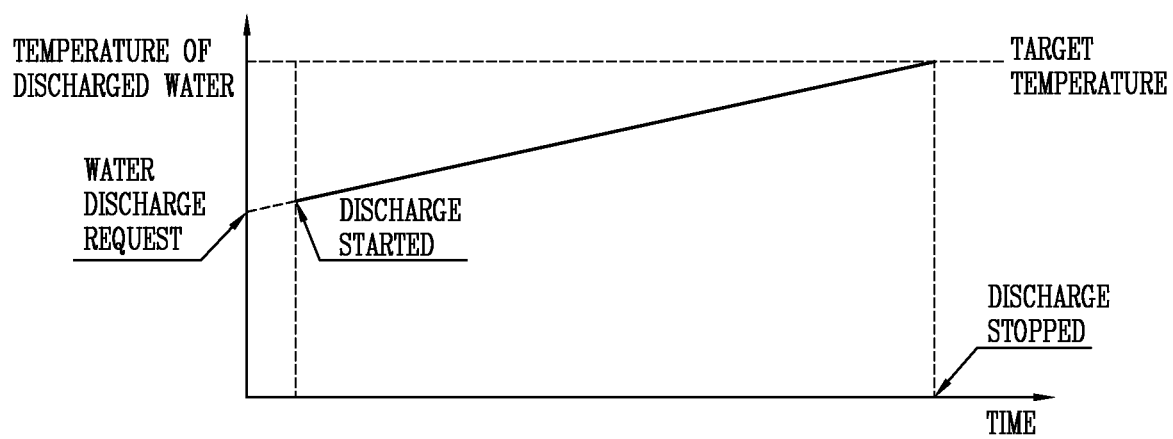
FIG. 5 is a graph showing a temperature of hot water discharged from the related art water purifier on the time basis.

On the other hand, in the related art water purifier, when the user sets a target temperature and applies a hot water discharge request, the controller 1080 supplies purified water into the hot water tank and applies a current to the working coil. At this time, since the hot water tank is heated from room temperature, the temperature of the hot water tank is lower than the target temperature for a predetermined time after the water discharge request is applied. Therefore, as illustrated in FIG. 5, a temperature of purified water which is taken out through the hot water tank immediately after the water discharge request is applied is lower than the target temperature.

Generally, the user gets water taken out from the water purifier in a predetermined container for use, and thus the water taken out from the water purifier is mixed in the container. In such a case, the temperature of the purified water mixed in the container becomes lower than the target temperature due to the water which has been discharged from the water purifier for the predetermined time after the water discharge request is applied and is lower than the request temperature. Therefore, there is a problem that the user cannot obtain water at a desired temperature.

In order to solve the above-mentioned problem, the present disclosure provides a water purifier for allowing water, which is discharged therefrom for a time from a starting time point that water is discharged to a time point that the water discharge is stopped, to reach a target temperature when such water is mixed. Hereinafter, a control method of the controller according to the present disclosure will be described in detail.

Figure 6:
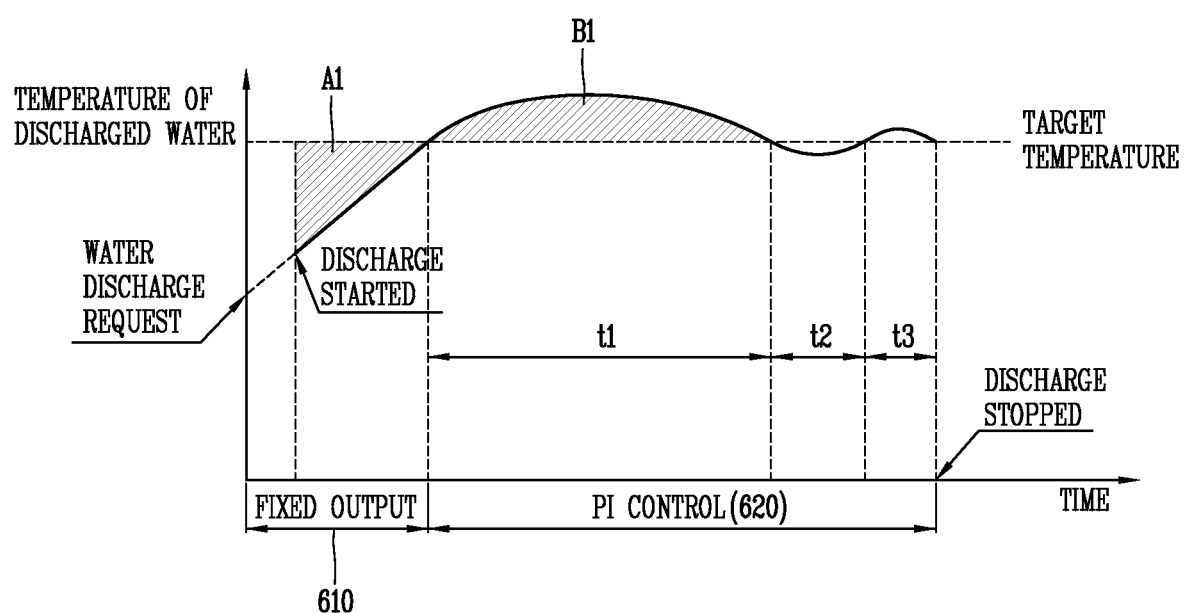
FIG. 6 is a graph showing a temperature of hot water discharged from the water purifier according to the present disclosure on the time basis.
Figure 7:
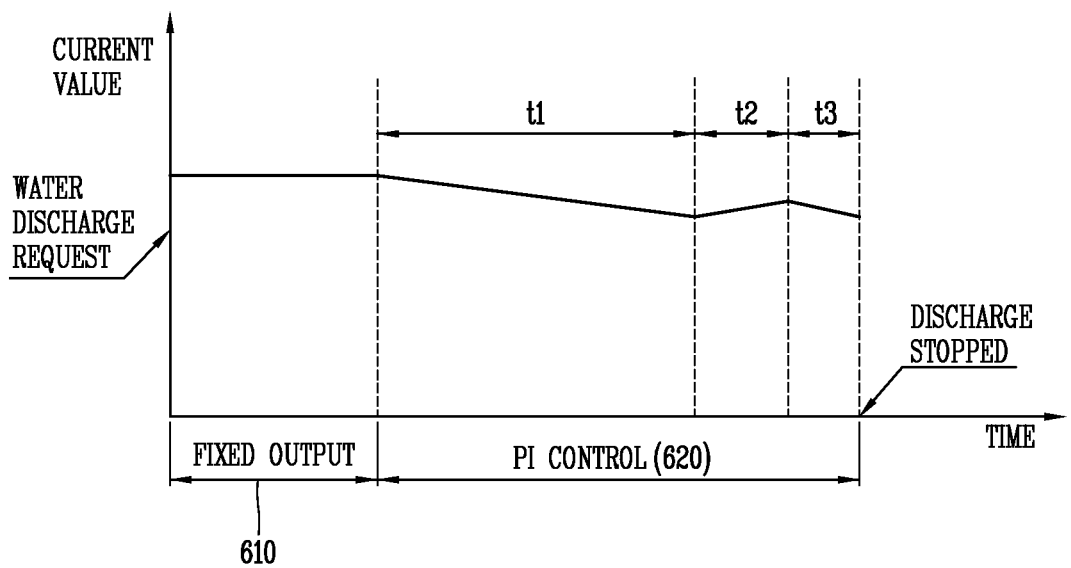
FIG. 7 is a graph showing a value of a current supplied to a working coil according to a lapse of time in order to cause a temperature change described with reference to FIG. 6.

FIG. 6 is a graph showing a temperature of hot water discharged from the water purifier according to the present disclosure on the time basis, and FIG. 7 is a graph showing a value of a current applied to the working coil 1140 to cause a temperature change illustrated in FIG. 6 on the basis of a lapse of time. The water purifier according to the present disclosure may pour a preset volume of water when the user sets a target temperature and applies a hot water discharge request. Here, the preset volume may be changed by a user request. This will be described later.

When the hot water discharge request is applied, the controller 1080 supplies purified water to the hot water tank by controlling opening and closing of the water supply valve 1312 and the flow rate adjustment valve 1351. Here, the controller 1080 supplies the purified water to the hot water tank as soon as the hot water discharge request is applied, or may supply the purified water to the hot water tank after a predetermined time elapses from a time point that the hot water discharge request has been applied. An embodiment related to a time point that the controller 1080 supplies the purified water to the hot water tank in response to the hot water discharge request being applied will be described later.

On the other hand, when the hot water discharge request is applied, the controller 1080 causes a current to flow on the working coil 1140 so that the hot water tank is inductively heated. The controller 1080 may increase the temperature of the hot water tank or may maintain the temperature of the hot water tank at a predetermined temperature through the induction heating. On the other hand, when the temperature of the hot water tank rises above a predetermined temperature value, the induction heating may be stopped to reduce the temperature of the hot water tank. The temperature change of the hot water tank is decided according to a current value of the current flowing on the working coil 1140.

On the other hand, since the purified water supplied to the hot water tank is heated while passing through the hot water tank, a temperature of purified water discharged from the water outlet 1020 is decided according to the temperature of the hot water tank. When the temperature of the hot water tank changes according to a lapse of time, the temperature of the purified water discharged from the water outlet 1020 changes according to the temperature change of the hot water tank.

Meanwhile, the water purifier according to the present disclosure may include a second temperature sensor to sense the temperature of the hot water tank, in addition to the first temperature sensor 1380 to sense the temperature of the purified water discharged through the water outlet 1020. Hereinafter, the temperature of the purified water discharged through the water outlet 1020 and the temperature of the hot water tank described in this specification are temperatures sensed by the first and second temperature sensors, respectively.

In the present specification, a value of a current flowing on the working coil 1140, a temperature of the hot water tank, and a temperature of purified water discharged through the water outlet 1020 will be described in association with one another. Referring to FIG. 6, according to the present disclosure, water having a temperature lower than a target temperature is discharged for a predetermined time from a time point that the hot water discharge request is applied to an ending time point of the water discharge, and water having a temperature higher than the target temperature is discharged for a predetermined time. Accordingly, when mixing such water discharged from the water purifier, a temperature of the mixed water reaches the target temperature.

In detail, the controller 1080 controls a value of a current flowing on the working coil 1140, such that purified water of a temperature lower than the target temperature is discharged for a time 610 from an applied time point of a water discharge request to a predetermined time point, and purified water of a temperature higher than the target temperature is discharged after the predetermined time point.

Explaining the control of the controller 1080 from the applied time point of the water discharge request to the predetermined time point, the controller 1080 controls a current having a preset current value to flow on the working coil 1140 from the applied time point of the water discharge request. Here, hot water may not be discharged through the water outlet 1020 immediately after the water discharge request is applied. This is because it takes a predetermined time for purified water supplied to the hot water tank to pass through the hot water tank. The preset current value may be set based on at least one of a target temperature value, a volume of purified water to be discharged, and a temperature of the hot water tank when the water discharge request is applied.

On the other hand, referring to FIG. 7, the controller 1080 may maintain a preset current value of a current flowing on the working coil 1140 for a time 610 until a temperature of purified water discharged from the water outlet 1020 reaches the target temperature. Accordingly, the temperature of the hot water tank and the temperature of the discharged purified water can be linearly increased. In this specification, a control method for causing a constant current to flow on the working coil 1140 is referred to as a "fixed output mode."

On the other hand, the controller 1080 may release the fixed output mode from a time point when the temperature of the purified water discharged from the water outlet 1020 reaches the target temperature. The controller 1080 may control the value of the current flowing on the working coil 1140 based on at least one of the temperature of the purified water discharged from the water outlet 1020 and the temperature of the hot water tank, after the release of the fixed output mode.

For example, referring to FIG. 7, for a time 620 taken until the water discharge is ended after the fixed output mode is released, the controller 1080 may change the value of the current flowing on the working coil 1140 in real time according to at least one of the temperature of the purified water discharged from the water outlet 1020 and the temperature of the hot water tank. In this specification, a control method for controlling the value of the current flowing on the working coil 1140 according to at least one of the temperature of the purified water discharged from the water outlet 1020 and the temperature of the hot water tank is referred to as a "PI control mode".

Referring back to FIG. 6, when a volume of the purified water discharged from the water purifier per hour is constant, an area of a first region A1 corresponds to a quantity of heat used for water, which has been discharged from the water purifier and has a temperature lower than the target temperature, to reach the target temperature. On the other hand, an area of a second region B1 corresponds to a quantity of surplus heat of purified water, which has been discharged from the water purifier and has a temperature higher than the target temperature.

When the areas of the first region A1 and the second region B1 are equal to each other, the target temperature is obtained when such water discharged from the water purifier is mixed. The controller 1080 may control the value of the current flowing on the working coil 1140 so that the areas of the first region A1 and the second region B1 become equal to each other.

At this time, even if the PI control mode is started, the controller 1080 may control a current having a value corresponding to the fixed output mode to flow on the working coil 1140, based on at least one of a target temperature value, a volume of purified water to be discharged and a temperature of purified water which has been discharged. That is, if desired, the controller 1080 may continuously increase the temperature of the hot water tank even when the water discharged from the water purifier reaches the target temperature. Accordingly, the controller 1080 adjusts the area of the second region B1 according to the area of the first region A1.

On the other hand, after the area of the first region A1 becomes equal to the area of the second region B1, the controller 1080 may control the value of the current flowing on the working coil 1140, such that the purified water of the target temperature is continuously discharged from the water outlet 1020 until the water discharged is ended. At this time, purified water heated to the target temperature by an external factor may be cooled before being discharged, and latent heat of the hot water tank may increase a temperature of purified water to be higher than the target temperature.

Referring to t1 to t3 illustrated in FIGS. 6 and 7, the PI control will be described in more detail. In the t1 section, the controller 1080 gradually decreases the value of the current flowing on the working coil 1040. Accordingly, in the t1 section, the temperature of the purified water discharged from the water outlet 1020 increases and then starts to decrease. The controller 1080 may control a reduced amount of currents in the t1 section such that the area of the first region A1 and the area of the second region B1 become equal to each other. An ending time point of the t1 section is a time point that the area of the first region A1 becomes equal to the area of the second region B1.

After the t1 section has passed, the controller 1080 may perform a control (t2 section, hereinafter, referred to as "temperature-increasing control") for a case where the temperature of the discharged purified water becomes lower than the target temperature, and a control (t 3 section, hereinafter, referred to as "temperature-decreasing control") for a case where the temperature of the discharged purified water becomes higher than the target temperature.

Explaining the t2 section, when a temperature of water which is discharged from the water purifier becomes lower than the target temperature, the controller 1080 increases the value of the current flowing on the working coil 1040, so as to prevent the temperature of the discharged water from being decreased below a preset temperature based on the target temperature.

Explaining the t3 section, when the temperature of the water which is discharged becomes higher than the target temperature, the controller 1080 decreases the value of the current flowing on the working coil 1040, so as to prevent the temperature of the discharged water from being increased above a preset temperature based on the target temperature.

Meanwhile, FIGS. 6 and 7 have illustrated the embodiment that the controller 1080 performs both the temperature-increasing control and the temperature-decreasing control. However, the controller 1080 does not necessarily perform both the temperature-increasing control and the temperature-decreasing control in the PI control mode. The controller 1080 may selectively perform the temperature-increasing control and the temperature-decreasing control only when the temperature of the discharged water becomes lower than or higher than the target temperature after the t1 section has passed.

In summary, it is practically difficult for the temperature of the purified water discharged from the water outlet 1020 to be equal exactly to the target temperature. The controller 1080 may control the value of the current flowing on the working coil 1140 so that the temperature of the purified water discharged from the water outlet 1020 is within a predetermined error range with respect to the target temperature.

As described above, according to the present disclosure, water which has temperature lower than the target temperature may be discharged from the water purifier for a predetermined time from when the hot water discharge request is applied to when the water discharged is ended, and water which has temperature higher than the target temperature may be discharged from the water purifier for a predetermined time, such that the target temperature can be reached when such water discharged from the water purifier is mixed. Accordingly, the present disclosure can supply hot water of a user-desired temperature even when there is no hot water storage.

On the other hand, the user may apply a water discharge stop request while water is discharged from the water purifier. In this case, when a temperature deviation of purified water discharged from the water purifier is large, the temperature of the discharged purified water greatly changes according to the time point that the user applies the water discharge stop request. The present disclosure can supply hot water of a temperature as close as the target temperature even though the user applies the water discharge stop request while hot water is discharged from the water purifier.

To this end, the area of the first region A1 described with reference to FIG. 6 must be reduced. When the area of the first region A1 is reduced, the temperature deviation (temperature difference) of the purified water discharged from the water purifier may be reduced. Specifically, as a small temperature deviation is made between the temperature of the discharged purified water, which is higher than the target temperature, and the target temperature, an amount of purified water which should be additionally discharged from the water purifier and has a temperature higher than the target temperature is reduced. That is, as the area of the first region A1 is reduced, the area of the second region B1 is reduced.

Here, in order to reduce the area of the first region A1, the value of the current flowing on the working coil 1140 in the fixed output mode may be increased. In such a case, a time which is taken until the temperature of the discharged purified water reaches the target temperature from the start of the water discharge may be shortened, and thus the area of the first region can be reduced.

However, when the value of the current flowing on the working coil 1140 in the fixed output mode is excessively high, latent heat of the hot water tank may cause a problem. Specifically, when the value of the current flowing on the working coil 1140 in the fixed output mode is excessively high, the hot water tank may maintain a high temperature even if the fixed output mode is released. As a result, a temperature of purified water which is to be discharged from the water purifier after the release of the fixed output mode may become excessively higher than the target temperature. When the value of the current flowing on the working coil 1140 is excessively high due to the latent heat problem of the hot water tank, the temperature deviation of the purified water discharged from the water purifier may increase. In order to solve this problem, the controller 1080 quickly heats the hot water tank for a predetermined time from when the hot water discharge request is applied.

Figure 8:
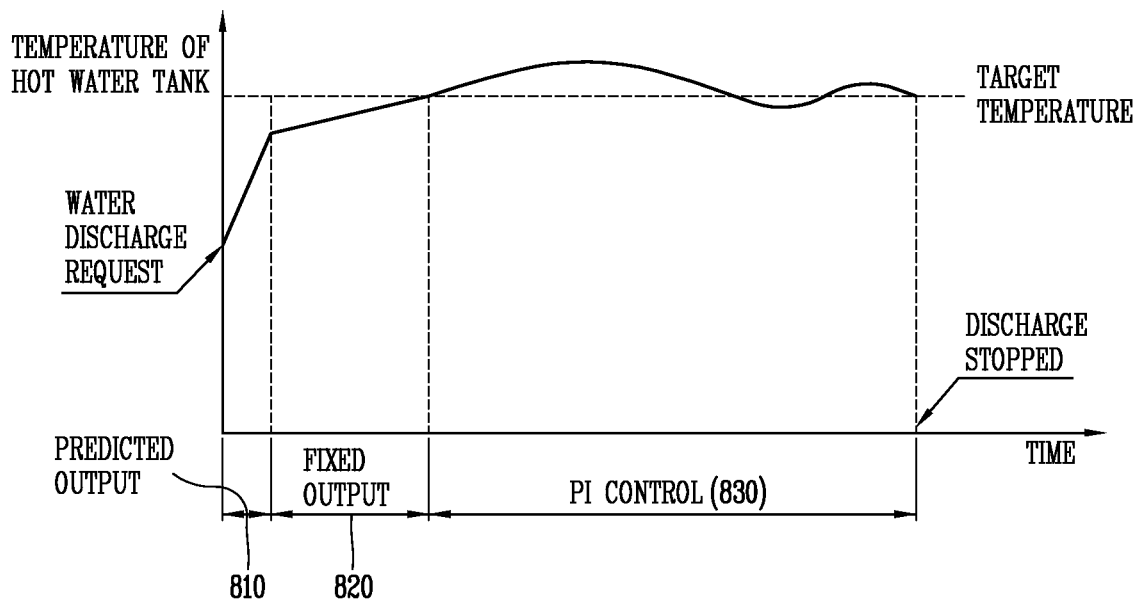
FIG. 8 is a graph showing a temperature of a hot water tank included in the water purifier according to the present disclosure on the time basis.
Figure 9:
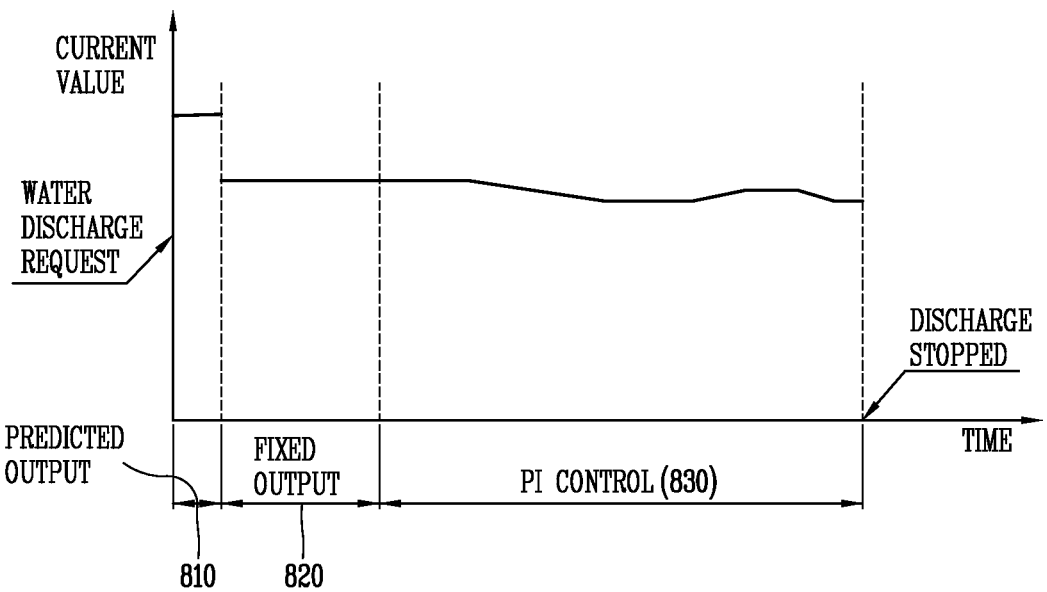
FIG. 9 is a graph showing a value of a current supplied to the working coil according to a lapse of time in order to cause a temperature change of the hot water tank described in FIG. 8.
Figure 10:
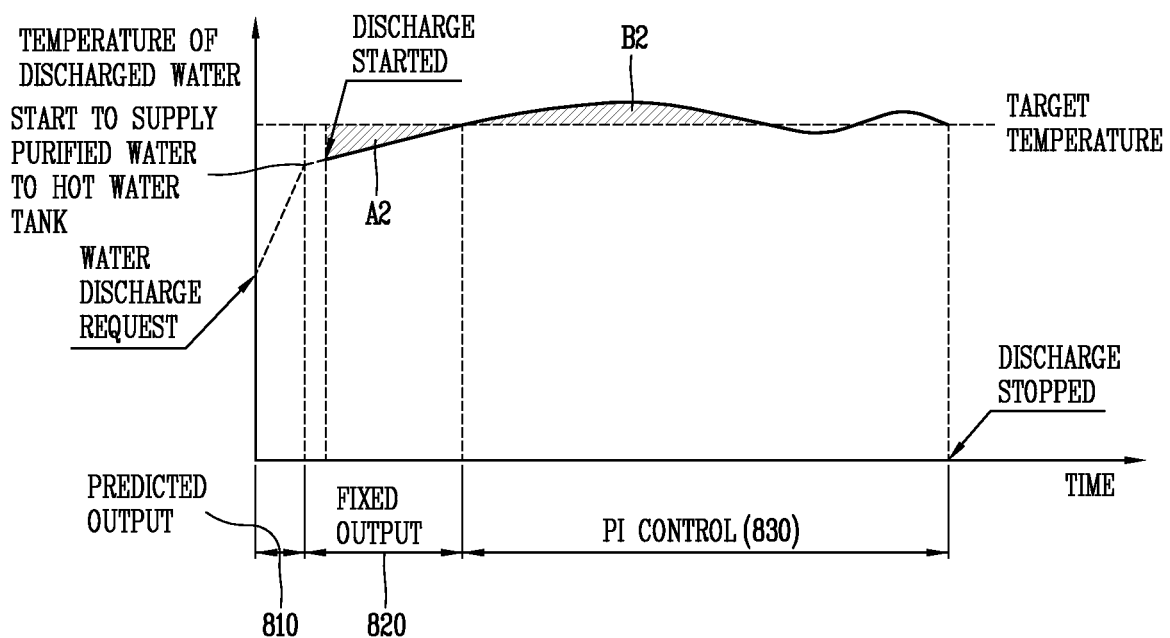
FIG. 10 is a graph showing a temperature of purified water discharged through the hot water tank described in FIG. 8 according to a lapse of time.

FIG. 8 is a graph showing a temperature of the hot water tank included in the water purifier according to the present disclosure on the time basis, FIG. 9 is a graph showing a value of a current, which supplied to the working coil 1140 in order to cause a temperature change of the hot water tank described in FIG. 8, according to a lapse of time, and FIG. 10 is a graph showing a temperature of purified water which is discharged through the hot water tank described in FIG. 8 according to a lapse of time.

Referring to FIG. 8, the controller 1080 may control the value of the current flowing on the working coil 1140, so that the temperature of the hot water tank increases at a first slope for a first time 810 from a time point when the hot water discharge request is applied, and the temperature of the hot water tank increases at a second slope smaller than the first slope for a second time 820 subsequent to the first time.

In detail, referring to FIG. 9, the controller 1080 may control a current of a first current value to flow on the working coil 1140 for the first time 810 from the time point that the hot water discharge request is applied, and control a current of a second current value to flow on the working coil 1140 for the second time 820 subsequent to the first time 810. Here, the first current value is greater than the second current value, and the first time 810 is shorter than the second time 820.

That is, when the hot water discharge request is applied, the controller 1080 heats the hot water tank with high power for a short time, and then gradually increases the temperature of the hot water tank with low power for a long time. In this specification, a driving method in which a current having a relatively high current value flows on the working coil 1140 for a predetermined period of time after the hot water discharge request is applied is referred to as a "predicted output mode."

Here, since the temperature of the purified water discharged from the water outlet 1020 does not reach the target temperature for the first time, the problem of the excessively rising temperature of the purified water, which is discharged from the water purifier, due to the latent heat of the hot water tank is not caused.

On the other hand, the controller 1080 may not supply the purified water to the hot water tank immediately in response to the hot water discharge request. Specifically, the controller 1080 may not immediately open the water supply valve 1312 and the flow rate adjustment valve 1351 even if the hot water discharge request is applied.

Referring to FIG. 10, the controller 1080 may heat the hot water tank in the predicted output mode after the hot water discharge request is applied, and then open the water supply valve 1312 and the flow rate adjustment valve 1351 to supply the purified water to the hot water tank when the predicted output mode is ended. Accordingly, when the hot water discharge request is applied, the present disclosure can preheat the hot water tank for a predetermined time, and then supply purified water to the hot water tank, thereby increasing a temperature of purified water, which is first discharged after the hot water discharge request is applied.

Referring to FIG. 10, the controller 1080 controls areas of a third region A2 and a fourth region B2 to be equal to each other, such that water discharged from the water purifier can reach a target temperature when such water is mixed. According to the method, a delay may be caused until hot water is discharged from the water purifier after the hot water discharge request is applied, but a temperature deviation of purified water discharged from the water purifier can be greatly reduced.

On the other hand, the controller 1080 terminates the predicted output mode and heats the hot water tank in the fixed output mode until the temperature of the purified water discharged from the water outlet 1020 reaches the target temperature. Thereafter, the controller 1080 heats the hot water tank in the PI control mode for a time 830 from when the fixed output mode is released to when the water discharge is ended.

In summary, the controller 1080 can heat the hot water tank in the order of the predicted output mode, the fixed output mode, and the PI control mode when the water discharge request is applied, and supply the purified water to the hot water tank from when the predicted output mode is released. Thus, the controller 1080 can reduce the temperature deviation of the purified water discharged from the water purifier and make it possible to reach the target temperature when mixing a predetermined volume of water discharged from the water purifier.

Figure 11:
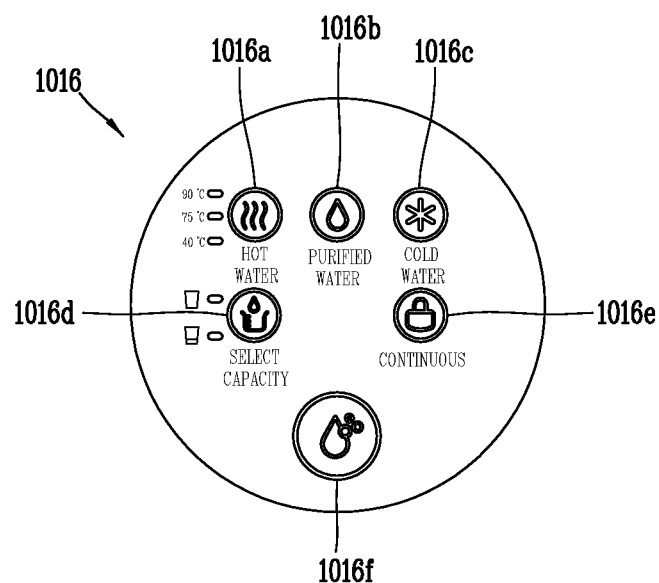
FIGS. 11 and 12 are conceptual views illustrating an input unit of the water purifier according to the present disclosure.
Figure 12:
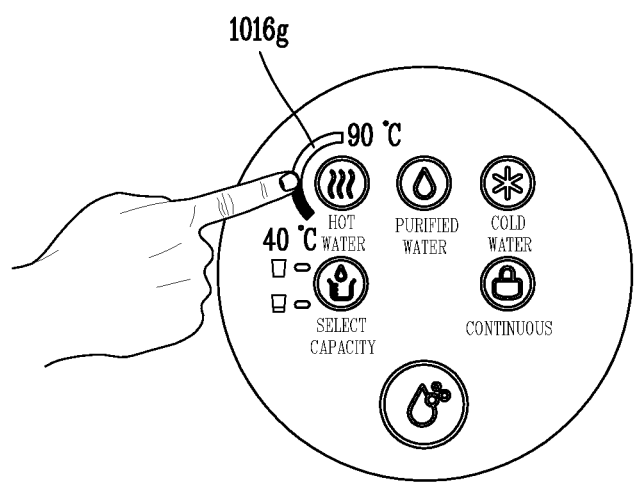

Meanwhile, the water purifier according to the present disclosure can allow the user to set a target temperature and a volume of purified water discharged therefrom. FIGS. 11 and 12 are conceptual views illustrating the input unit of the water purifier according to the present disclosure.

Referring to FIG. 11, the input unit 1016 of the water purifier according to the present disclosure may include a hot water button 1016a, a purified water button 1016b, a cold water button 1016c, a capacity selection button 1016d, a continuous discharge button 1016e, and a water discharge request button 1016f. However, the present disclosure is not limited thereto.

When any one of the hot water button 1016a, the purified water button 1016b and the cold water button 1016c is operated, the controller 1080 switches the water purifier into a water discharge waiting state with respect to water of a type, which corresponds to the operated button, of hot water, purified water and cold water. In this specification, operating the button included in the input unit 1016 refers to pressing the button or applying a touch to the button.

When the water discharge button 1016f is operated in a state where the water purifier is set to any one of a hot water discharge waiting state, a purified water discharge waiting state and a cold water discharge waiting state, the controller 1080 controls water of a type corresponding to the one state to be discharged from the water purifier.

For example, when the water discharge button 1016f is operated after the hot water button 1016a is operated, the controller 1080 may determine that the hot water discharge request has been applied and may perform the control described in FIGS. 6 to 10.

Meanwhile, the water purifier according to the present disclosure may allow a temperature of hot water, which is to be discharged, to be input through the input unit. For example, when the hot water button 1016a illustrated in FIG. 11 is operated, the controller 1080 sets the target temperature to a first temperature. Thereafter, the controller 1080 may change the target temperature every time the hot water button 1016a is operated.

At this time, the target temperature change according to the operation of the hot water button 1016a may be made within a set of temperature values. For example, the set of temperature values may be 40° C., 75° C., and 90° C. When the hot water button 1016a is operated repeatedly, the target temperature may be sequentially changed to 40° C., 75° C., and 90° C.

Thereafter, when the water discharge request button 1016f is applied while the target temperature has been set to a specific temperature, hot water of the specific temperature may be discharged.

On the other hand, when the capacity selection button 1016d is repeatedly operated, the controller 1080 may change a volume of purified water to be discharged according to the water discharge request. When the water discharge request button 1016f is operated after the continuous water discharge button 1016e is operated, the controller 1080 may continuously discharge water until the water discharge stop request is applied by the user. When the water discharge request button 1016f is operated while the water is discharged from the water outlet 1020, the controller 1080 may recognize that the water discharge stop request has been applied and may stop the water discharge.

On the other hand, the user interface for setting the target temperature is not limited to that described in FIG. 11. For example, referring to FIG. 12, the water purifier according to the present disclosure may freely set the target temperature within a predetermined temperature range. Specifically, the input unit may include a hot water temperature adjusting portion 1016g, and a touch sensor to sense a user's touch to the hot water temperature adjusting portion 1016g.

When a touch is applied to the hot water temperature adjusting portion 1016g, the controller 1080 sets the target temperature to a temperature corresponding to a point where the touch has been applied. Here, each point of the hot water temperature adjusting portion 1016g may correspond to a specific temperature. For example, one end of the hot water temperature adjusting portion 1016g may correspond to a first temperature, and another end thereof may correspond to a second temperature. Points between the one end and the another end of the hot water temperature adjusting portion 1016g may correspond to temperatures between the first and second temperatures. In this case, the user can set the target temperature to a temperature between the first and second temperatures by touching one point between the one end and the another end of the hot water temperature adjusting portion 1016g.

As illustrated in FIGS. 11 and 12, when the target temperature is set by the user, a value of a current flowing on the working coil 1140 in the predicted output mode and the fixed output mode may be set according to the target temperature.

Figure 13:
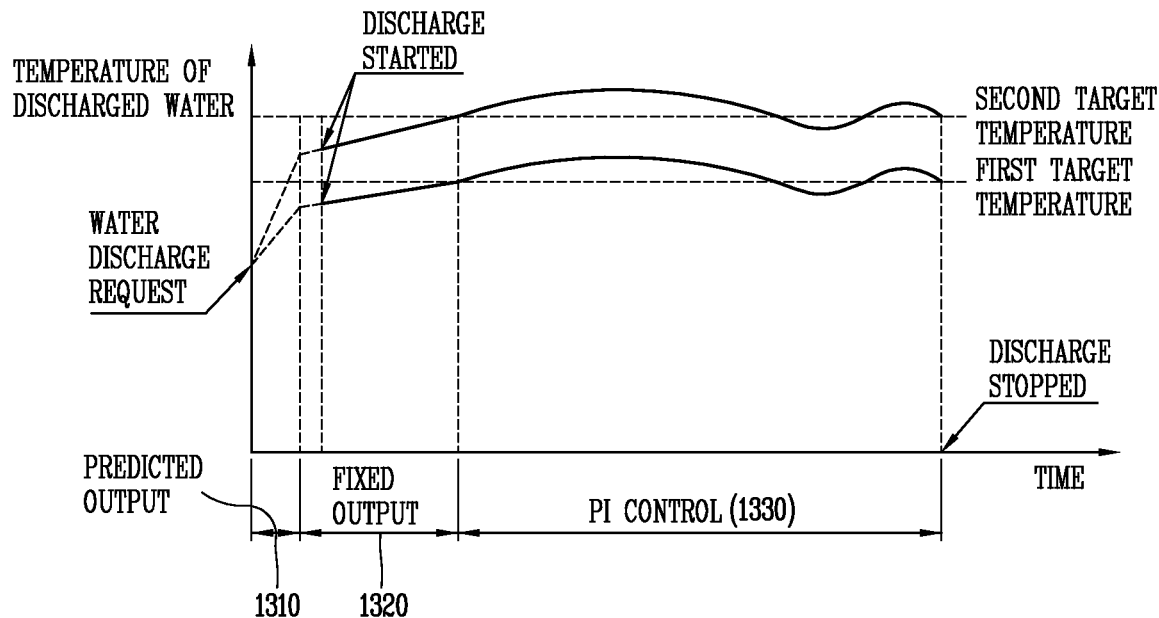
FIG. 13 is a graph showing temperature changes of hot water discharged from the water purifier, according to a lapse of time, when a hot water discharge (output, supply) request for each of first and second target temperatures is applied.

FIG. 13 is a graph showing temperature changes of hot water discharged from the water purifier, according to a lapse of time, when a hot water discharge request for each of first and second target temperatures is applied. First, the controller 1080 may set a larger value of a current flowing on the working coil 1140 in the predicted output mode as the set target temperature is higher. For example, referring to FIG. 13, when the target temperature is set high, a heating rate of the hot water tank in the predicted output mode may be increased.

As the set target temperature is higher, a time for the hot water tank to reach the target temperature increases more. Therefore, a temperature deviation of purified water discharged from the water purifier increases. In order to reduce the temperature deviation, the controller 1080 may preheat the hot water tank to a higher temperature by setting a greater value of the current flowing on the working coil 1140 as the set target temperature is higher.

On the other hand, the controller 1080 may control the target temperature and the current value flowing on the working coil 1140 to have a linear relationship. When the value of the current flowing on the working coil 1140 is set too high as the target temperature is set high, the temperature deviation of the purified water discharged from the water purifier may increase due to latent heat of the hot water tank. In order to prevent this, the controller 1080 controls the target temperature and the value of the current flowing on the working coil 1140 to have the linear relationship, thereby preventing the value of the current flowing on the working coil 1140 from being set too high.

On the other hand, as another example, as the set target temperature is higher, the controller 1080 may set the current flowing on the working coil 1140 to a higher value and simultaneously set an operating time in the predicted output mode to be longer. Accordingly, the controller 1080 may reduce a time for which water discharged from the water purifier from the time point that the water discharge request has been applied reaches the target temperature.

Next, the controller 1080 may set the current flowing on the working coil 1140 to a higher value in the fixed output mode as the set target temperature is higher. At this time, the controller 1080 may allow the target temperature and the value of the current flowing on the working coil 1140 to have the linear relationship. This is to prevent the value of the current flowing on the working coil 1140 from being set too high as the target temperature is set high.

The foregoing description has been given of the embodiment in which a predetermined volume of water is discharged according to a hot water discharge request and a target temperature is obtained when such discharged water is mixed.

Meanwhile, the water purifier according to the present disclosure may not discharge a predetermined volume of water according to a hot water discharge request, but may discharge hot water continuously until before a water discharge stop request is applied by the user. In this specification, an operating method in which hot water is continuously discharged until the water discharge stop request is applied by the user is referred to as "continuous hot water discharge." In this case, it is important to minimize a time delay until purified water of the target temperature is discharged from the water outlet 1020 after the water discharge request is applied.

Hereinafter, description will be given of a control method of the controller 1080 in the case where the water purifier according to the present disclosure continuously discharges hot water until the user's water discharge stop request is applied from the time point that the hot water discharge request is applied.

Figure 14:
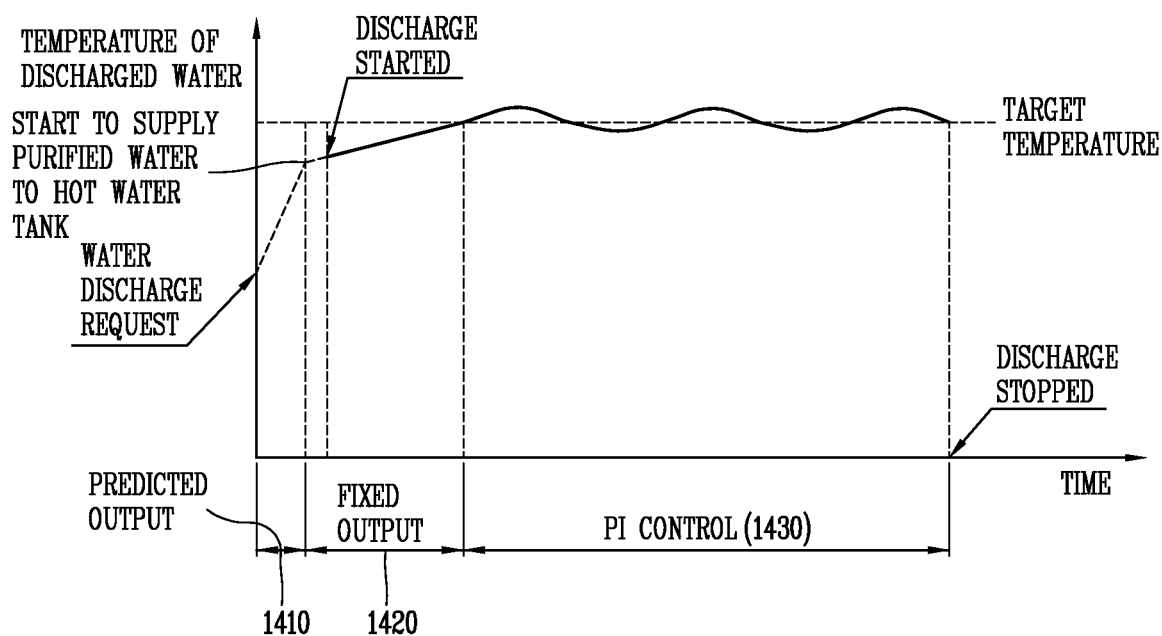
FIG. 14 is a graph showing a temperature of purified water discharged from the water purifier according to a lapse of time when the water purifier continuously drops the purified water.

FIG. 14 is a graph showing a temperature of purified water discharged from the water purifier according to a lapse of time when the water purifier continuously discharges the purified water. The controller 1080 may control a current of a first current value to flow on the working coil 1140 for a preset time after a continuous hot water discharge request is applied, and control a current of a second current value to flow on the working coil 1140 until a temperature of purified water discharged from the water outlet 1020 reaches a target temperature after the preset time elapses. At this time, the first current value may be larger than the second current value.

In detail, referring to FIG. 14, the controller 1080 heats the hot water tank in a predicted output mode 1410 for a preset time, in response to the continuous hot water discharge request. At this time, the controller 1080 may not supply purified water to the hot water tank, but may supply the purified water to the hot water tank after the predicted output mode is released. Accordingly, the controller 1080 may set a temperature of purified water, which is first discharged from the water outlet 1020 after the continuous hot water discharge request is applied, to be as close as the target temperature.

Referring to FIG. 14, the controller 1080 controls the current of the second current value lower than the first current value to flow on the working coil 1140 for a time 1420 until the temperature of the purified water discharged from the water outlet 1020 reaches the target temperature after the preset time elapses, thereby preventing the temperature of the purified water which is discharged from the water purifier from being excessively increased due to latent heat of the hot water tank.

On the other hand, the controller 1080 may control the value of the current flowing on the working coil 1140, such that purified water having a temperature within a predetermined error range based on the target temperature can continuously flow through the water outlet 1020, for a time 1430 until the water discharge stop request is applied after the temperature of the purified water discharged from the water outlet 1020 reaches the target temperature.

Compared with the control method described with reference to FIGS. 6 to 10, the controller 1080 releases the fixed output mode as the temperature of the purified water discharged from the water outlet 1020 reaches the target temperature. Afterwards, the controller 1080 controls the value of the current flowing on the working coil 1140, such that the temperature of the purified water discharged from the water outlet 1020 is within a predetermined error range with respect to the target temperature without being increased any more. At this time, the controller 1080 controls the value of the current flowing on the working coil 1140 according to the temperature of the purified water discharged from the water outlet 1020. That is, when the continuous hot water discharge request is applied, the controller 1080 prevents a discharge of purified water which has a temperature higher than the target temperature by a preset temperature or more.

Accordingly, the controller 1080 can supply the purified water of the target temperature continuously from the time point that the fixed output mode is released. As described above, the water purifier according to the present disclosure can quickly preheat the hot water tank for a preset time when the continuous hot water discharge request is applied, thereby allowing the temperature of the purified water discharged from the water outlet 1020 to quickly reach the target temperature. When the temperature of the purified water discharged from the water outlet 1020 is close to the target temperature, the hot water tank may gradually be heated, so as to prevent the temperature of the purified water, which is discharged from the water outlet 1020, from being excessively increased over the target temperature due to latent heat of the hot water tank.

A first aspect of the present disclosure is to provide a water purifier, capable of discharging a different quantity of purified water with a different temperature, in response to a hot water discharge request, and reaching a target temperature when discharged water is mixed. A second aspect of the present disclosure is to provide a water purifier, capable of minimizing a temperature deviation of purified water discharged at each time point while a predetermined quantity of purified water is discharged in response to a hot water discharge request.

A third aspect of the present disclosure is to provide a water purifier, capable of preventing purified water from being heated more than necessary due to latent heat of a hot water tank when the hot water tank is heated according to a hot water discharge request. A fourth aspect of the present disclosure is to provide a water purifier, capable of minimizing a time taken until a temperature of purified water discharged from the water purifier reaches a target temperature and simultaneously preventing purified water from being heated more than necessary due to latent heat of a hot water tank, when hot water is continuously discharged until a user's water discharge stop request is applied after a hot water discharge request is applied.

In order to achieve the first aspect of the present disclosure, a temperature of a part of water discharged from the water purifier may be made lower than a target temperature and a temperature of another part may be made higher than the target temperature, so that the target temperature can be obtained when such purified water discharged from the water purifier is mixed.

In a detailed embodiment disclosed herein, the present disclosure provides water purifier, including a water outlet from which purified water is discharged, a first temperature sensor to sense a temperature of the purified water discharged from the water outlet, an induction heating module provided with a working coil forming a magnetic field according to a flow of a current, and a hot water tank heated by the magnetic field formed on the working coil and receiving the purified water to deliver to the water outlet, and a controller to control the current to flow on the working coil while the purified water is delivered to the water outlet through the hot water tank, in response to a water discharge request being applied. The controller may control a value of the current flowing on the working coil, such that purified water lower in temperature than the target temperature is discharged until a predetermined time point from the applied time point of the water discharge request, and purified water higher in temperature than the target temperature is discharged after the predetermined time point.

Meanwhile, in order to achieve the second aspect, the controller may control a current of a first current value to flow on the working coil for a first time from the applied time point of the water discharge request, and control a current of a second current value smaller than the first current value to flow on the working coil for a second time subsequent to the first time.

The controller may not supply purified water to the hot water tank for the first time and supply purified water to the hot water tank from after the first time. The first time may be shorter than the second time. The water purifier may further include a second temperature sensor to sense a temperature of the hot water tank, and the controller may set a length of the first time based on the temperature of the hot water tank sensed by the second temperature sensor.

In order to achieve the third aspect, the controller may control a value of the current flowing on the working coil according to the temperature of the hot water tank sensed by the second temperature sensor until the water discharge is stopped from a time point that the temperature of the purified water discharged from the water outlet reaches the target temperature.

The controller may control the value of the current flowing on the working coil according to the temperature of the purified water discharged from the water outlet sensed by the first temperature sensor, until the water discharge is stopped from a time point that the temperature of the purified water discharged from the water outlet reaches the target temperature.

The water purifier may further include an input unit to receive user inputs related to the target temperature and setting of the predetermined volume. The controller may change the target temperature based on a user input applied to the input unit, and change the first and second current values according to the changed target temperature.

The controller may increase a magnitude of the first current value as the target temperature is increased. The controller may increase a magnitude of the second current value as the target temperature is increased.

In order to achieve the fourth aspect, the present disclosure provides a water purifier, including a water outlet from which purified water is discharged, a first temperature sensor to sense a temperature of the purified water discharged from the water outlet, an induction heating module provided with a working coil forming a magnetic field according to a flow of a current, and a hot water tank heated by the magnetic field formed on the working coil and receiving the purified water to deliver to the water outlet, and a controller to control a current to flow on the working coil while the purified water is delivered to the water outlet through the hot water tank, in response to a water discharge request being applied. The controller may control a current of a first current value to flow on the working coil for a preset time from a time point that the water discharge request is applied, and control a current of a second current value to flow on the working coil until a temperature of the purified water discharged from the water outlet reaches the target temperature after the preset time elapses. The first current value may be greater than the second current value. The controller may not supply purified water to the hot water tank for the preset time and may supply purified water to the hot water tank after the preset time.

The water purifier may further include a second temperature sensor to sense a temperature of the hot water tank, and the controller may set a length of the preset time based on the temperature of the hot water tank sensed by the second temperature sensor.

The controller may control a current value flowing on the working coil, such that purified water of the target temperature is continuously discharged from the water outlet until a water discharge stop request is applied after a temperature of purified water discharged from the water outlet reaches the target temperature.

The controller may control the current value flowing to the working coil according to a temperature of purified water discharged from the water outlet until a water discharge stop request is applied from after the temperature of the purified water coming out from the water outlet reaches the target temperature.

In the present disclosure, water lower in temperature than a target temperature can be discharged for a predetermined time until a water outflow is terminated from when a hot water discharge request is applied, and water higher in temperature than the target temperature may be discharged for a predetermined time, such that the temperature of the discharged water can reach the target temperature when mixing such water discharged from the water purifier. Accordingly, the present disclosure can supply hot water of a temperature desired by a user even when there is no hot water storage.

In addition, the present disclosure may quickly preheat a hot water tank after a hot water discharge request is applied and then gradually increase a temperature of the hot water tank, thereby minimizing a temperature deviation of hot water discharged from the water purifier. Thus, the present disclosure may allow the user to be supplied with purified water of a temperature adjacent to a target temperature even though the water outflow is stopped during the hot water outflow.

Further, the present disclosure can quickly preheat a hot water tank for a predetermined time when a continuous hot water discharge request is applied, so that a temperature of purified water discharged from the water purifier can quickly reach a target temperature. Further, when a temperature of purified water coming out from the water purifier is close to a target temperature, a hot water tank can be gradually heated, thereby preventing a temperature of purified water discharged from the water purifier from excessively increasing over a target temperature due to latent heat of the hot water tank.

It will be apparent to those skilled in the art that the present disclosure may be embodied in other specific forms without departing from the spirit or essential characteristics thereof.

The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A water purifier to supply purified water that is heated based on a target temperature, the water purifier comprising:
    a water outlet from which the purified water is discharged;
    a first temperature sensor to detect a temperature of the purified water discharged from the water outlet;
    an induction heater having:
        a working coil that forms a magnetic field according to a current through the working coil, and
        a hot water tank that is heated by the magnetic field formed by the working coil and receives the purified water to be delivered to the water outlet; and
    a controller to manage the current to the working coil while the purified water is being delivered to the water outlet through the hot water tank, in response to a water discharge request,
    wherein the controller manages the current to the working coil such that the temperature of the purified water discharged from the water outlet is below the target temperature until a particular time after the water discharge request, and the temperature of the purified water discharged from the water outlet is higher than the target temperature after the particular time.

2. The water purifier of claim 1, wherein the controller manages the current to the working coil to have a first current value during a first time period after the water discharge request, and manages the current to the working coil to have a second current value during a second time period subsequent to the first time period, while the temperature of the discharged purified water is lower than the target temperature, and
    wherein the first current value is greater than the second current value.

3. The water purifier of claim 2, wherein the controller further causes the purified water to not be supplied to the hot water tank during the first time period, and causes the purified water to be supplied to the hot water tank after the first time.

4. The water purifier of claim 3, wherein the first time period is shorter than the second time period.

5. The water purifier of claim 4, further comprising a second temperature sensor to detect a temperature of the hot water tank, and
    wherein the controller further sets a duration of the first time period based on the temperature of the hot water tank detected by the second temperature sensor.

6. The water purifier of claim 4, wherein the controller controls the current to the working coil according to the temperature of the hot water tank sensed by the second temperature sensor, from a time point that the temperature of the purified water discharged from the water outlet reaches the target temperature to another time point that water outlet stops discharging the purified water.

7. The water purifier of claim 1, wherein the controller controls the current to the working coil according to the temperature of the purified water discharged from the water outlet that is detected by the first temperature sensor, until the water outlet stops discharging the purified water and from a time point that the temperature of the purified water discharged from the water outlet reaches the target temperature.

8. The water purifier of claim 1, further comprising a user interface to receive one or more user inputs related to the target temperature, and
wherein the controller changes the target temperature based on the one or more user inputs applied to the user interface and changes the current to the working coil according to a changed target temperature.

9. The water purifier of claim 8, wherein the controller manages the current to the working coil to have a first current value during a first time period after the water discharge request, and manages the current to the working coil to have a second current value during a second time period subsequent to the first time period, and increases a magnitude of the first current value as the target temperature is increased.

10. The water purifier of claim 9, wherein the controller increases a magnitude of the second current value as the target temperature is increased.

11. A water purifier to supply purified water that is heated based on a target temperature, the water purifier comprising:
a water outlet from which the purified water is discharged;
a first temperature sensor to detect a temperature of the purified water discharged from the water outlet;
an induction heater having:
a working coil that forms a magnetic field according to a current applied to the working coil, and
a hot water tank that is heated by the magnetic field formed by the working coil and receives the purified water to be delivered to the water outlet; and
a controller that manages the current to the working coil while the purified water is delivered to the water outlet through the hot water tank, in response to a water discharge request,
wherein the controller further manages the current to the working coil to have a first current value during a particular time period after the water discharge request is applied, and controls the current to the working coil to have a second current value after the particular time period elapses and until the temperature of the purified water discharged from the water outlet reaches the target temperature, and
wherein the first current value is greater than the second current value.

12. The water purifier of claim 11, wherein the controller causes the purified water to not be supplied to the hot water tank during the particular time period, and causes the purified water to be supplied to the hot water tank after the particular time period.

13. The water purifier of claim 11, further comprising a second temperature sensor to detect a temperature of the hot water tank, and
wherein the controller sets the particular time period based on the temperature of the hot water tank detected by the second temperature sensor.

14. The water purifier of claim 11, wherein the controller manages the current to the working coil so that purified water is continuously discharged from the water outlet at the target temperature after the temperature of the purified water discharged from the water outlet reaches the target temperature and until a water discharge stop request is received by the water purifier.

15. The water purifier of claim 14, wherein the controller manages the current to the working coil according to the temperature of the purified water discharged from the water outlet until the water discharge stop request is applied and from a time that the temperature of the purified water discharged from the water outlet reaches the target temperature.

16. The water purifier of claim 11, further comprising a user interface to receive one or more user inputs related to the target temperature, and
wherein the controller changes the target temperature based on the one or more user inputs applied to the user interface and changes the first and second current values according to a changed target temperature.

17. The water purifier of claim 16, wherein the controller increases the first current value as the target temperature is increased.

18. The water purifier of claim 16, wherein the controller increases the second current value as the target temperature is increased.

19. The water purifier of claim 16, wherein the user interface further receives at least one user input related to a volume of the heated purified water discharged by the water outlet, and
wherein the controller manages the current to the working coil according to the volume.

20. A water purified of claim 16, wherein controller manages the current to the working coil such that a first portion of the heated purified water is discharged by the water outlet below the target temperature, and a second portion of the heated purified water is discharged by the water outlet above the target temperature.

* * * * *